United States Patent
Honkura et al.

(10) Patent No.: US 9,666,341 B2
(45) Date of Patent: May 30, 2017

(54) PRODUCTION METHOD FOR ANISOTROPIC BONDED MAGNET AND PRODUCTION APPARATUS FOR SAME

(75) Inventors: Yoshinobu Honkura, Tokai (JP); Hironari Mitarai, Tokai (JP); Hiroshi Matsuoka, Tokai (JP); Masayuki Kato, Tokai (JP); Ikuzou Okumura, Tokai (JP)

(73) Assignee: AICHI STEEL CORPORATION, Aichi (JP)

( * ) Notice: Subject to any disclaimer, the term of this patent is extended or adjusted under 35 U.S.C. 154(b) by 778 days.

(21) Appl. No.: 13/639,785

(22) PCT Filed: Apr. 5, 2011

(86) PCT No.: PCT/JP2011/058636
§ 371 (c)(1),
(2), (4) Date: Nov. 28, 2012

(87) PCT Pub. No.: WO2011/126023
PCT Pub. Date: Oct. 13, 2011

(65) Prior Publication Data
US 2013/0093121 A1  Apr. 18, 2013

(30) Foreign Application Priority Data
Apr. 5, 2010  (JP) ................. 2010-086944

(51) Int. Cl.
*H01F 1/28* (2006.01)
*H01F 1/08* (2006.01)
(Continued)

(52) U.S. Cl.
CPC ............ *H01F 1/28* (2013.01); *B29C 43/003* (2013.01); *H01F 1/01* (2013.01); *H01F 1/083* (2013.01);
(Continued)

(58) Field of Classification Search
CPC ...... H01F 1/28; H01F 41/0266; H01F 41/028; H01F 41/0273; H01F 1/01; B29C 43/003
(Continued)

(56) References Cited

U.S. PATENT DOCUMENTS 2,903,329 A * 9/1959 Weber ................. C04B 35/2683
                                                      252/62.63
4,604,042 A * 8/1986 Tanigawa ............ B29C 45/0013
                                                      264/108
(Continued)

FOREIGN PATENT DOCUMENTS

JP    02-059993 B2    2/1990
JP    06-061083 A     3/1994
(Continued)

OTHER PUBLICATIONS

Office Action issued in Korean Patent Application No. 10-2012-7028916, dated Nov. 14, 2013.
(Continued)

*Primary Examiner* — Nahida Sultana
(74) *Attorney, Agent, or Firm* — Michael Best & Friedrich LLP

(57) ABSTRACT

A method for production of an anisotropic bonded magnet includes: aligning magnetic pole bodies which include an even number of permanent magnets arranged uniformly around an outer periphery of an annular cavity filled with magnetic raw material, aligning magnetic fields to cause rare-earth anisotropic magnet powder to be semi-radially aligned; compressively molding the semi-radially aligned magnet raw material to obtain an annular compact; discharging the compact from the annular cavity; demagnetizing causing the aligning magnetic pole bodies to relatively move only in circumferential direction with respect to the compact after the molding step thereby to apply demagnetization magnetic fields to the compact; The demagnetization mag-
(Continued)

netic fields are applied from the aligning magnetic pole bodies with opposite poles to those during the alignment step, and the demagnetization magnetic fields are in directions for cancelling the magnetization of the compact caused by the aligning magnetic fields.

18 Claims, 11 Drawing Sheets

(51) Int. Cl.
*H02K 15/03* (2006.01)
*B29C 43/00* (2006.01)
*H01F 1/01* (2006.01)
*H01F 41/02* (2006.01)
*H01F 1/057* (2006.01)

(52) U.S. Cl.
CPC ....... *H01F 41/028* (2013.01); *H01F 41/0266* (2013.01); *H01F 41/0273* (2013.01); *H02K 15/03* (2013.01); *H01F 1/0578* (2013.01)

(58) Field of Classification Search
USPC ...... 264/429, 299, 108, 310; 425/3, 174.8 R, 425/DIG. 33, 78; 310/164, 171
See application file for complete search history.

(56) References Cited

U.S. PATENT DOCUMENTS

| | | | | |
|---|---|---|---|---|
| 5,894,004 | A * | 4/1999 | Wagner | G03G 15/0921 264/40.1 |
| 5,894,404 | A * | 4/1999 | Vrnak | H01H 71/0264 174/545 |
| 6,000,922 | A * | 12/1999 | Wagner | B29C 33/308 264/427 |
| 6,125,255 | A * | 9/2000 | Litman | G03G 15/0921 399/276 |
| 7,592,889 | B2 * | 9/2009 | Honkura | B22F 3/03 264/427 |
| 8,039,998 | B2 * | 10/2011 | Masuzawa | H01F 1/0578 310/156.43 |
| 2001/0018029 | A1 * | 8/2001 | Ogawa et al. | 419/66 |
| 2003/0118467 | A1 * | 6/2003 | Sato | H01F 7/0268 419/66 |
| 2005/0034788 | A1 * | 2/2005 | Kim | H01F 41/028 148/104 |
| 2006/0139137 | A1 | 6/2006 | Honkura et al. | |
| 2008/0124235 | A1 | 5/2008 | Honkura et al. | |
| 2009/0085416 | A1 * | 4/2009 | Masuzawa et al. | 310/44 |
| 2009/0146518 | A1 | 6/2009 | Honkura et al. | |
| 2010/0065156 | A1 | 3/2010 | Honkura et al. | |
| 2013/0026863 | A1 * | 1/2013 | Asai | 310/44 |
| 2013/0069747 | A1 * | 3/2013 | Honkura et al. | 335/302 |
| 2015/0000114 | A1 * | 1/2015 | Matsushita et al. | 29/607 |

FOREIGN PATENT DOCUMENTS

| | | | | |
|---|---|---|---|---|
| JP | 08-097035 A | | 4/1996 | |
| JP | 08-111337 | * | 4/1996 | ............ H01F 41/02 |
| JP | 08-111337 A | | 4/1996 | |
| JP | 11-087164 A | | 3/1999 | |
| JP | 2004-023085 A | | 1/2004 | |
| JP | 2006-049554 A | | 2/2006 | |
| WO | WO-2005/104337 A1 | | 11/2005 | |
| WO | WO-2006/001304 A1 | | 1/2006 | |

OTHER PUBLICATIONS

International Search Report, mailed Jul. 12, 2011.
Extended search report issued in European Application No. 11765923.5, dated Mar. 5, 2014.

* cited by examiner

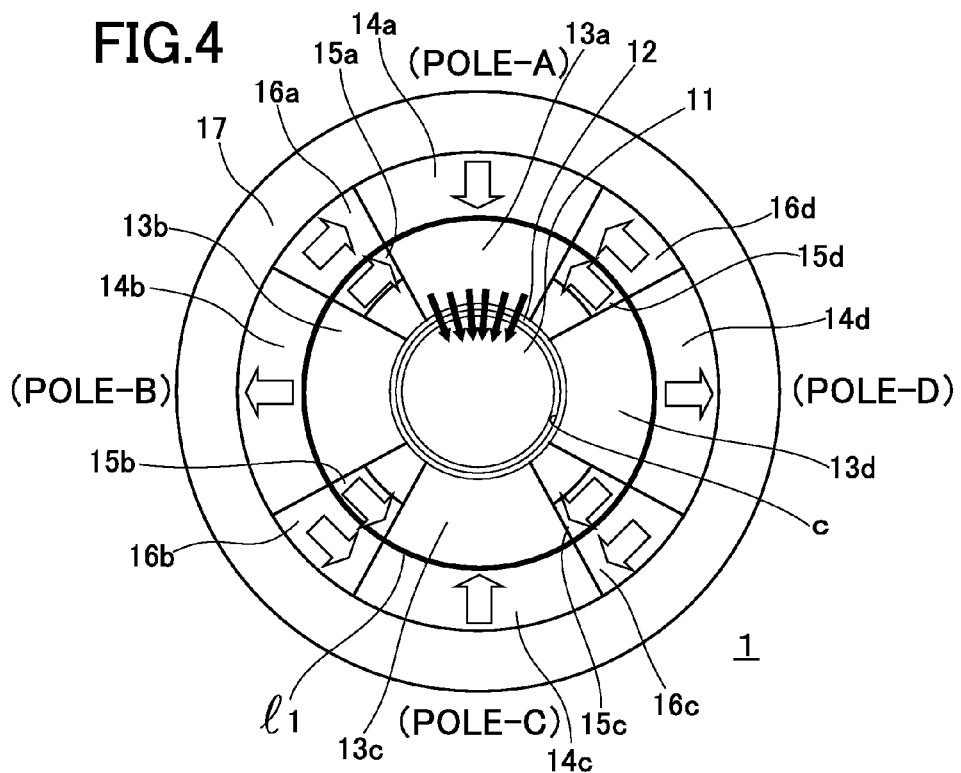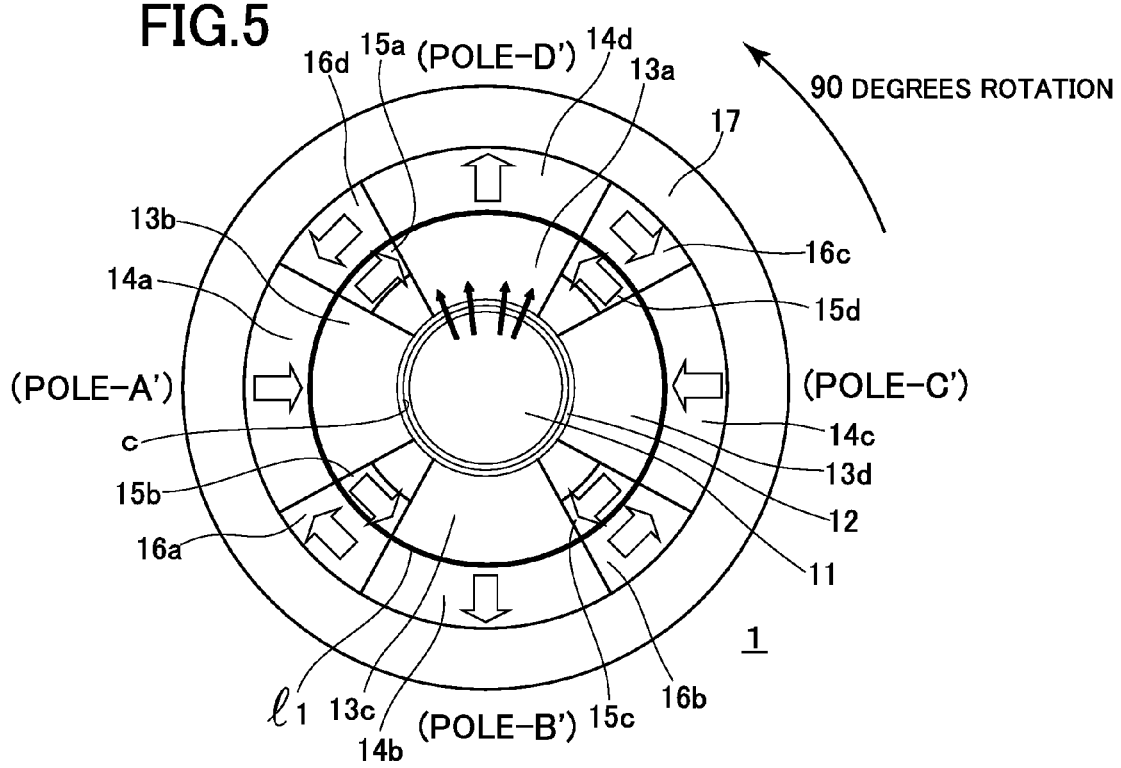

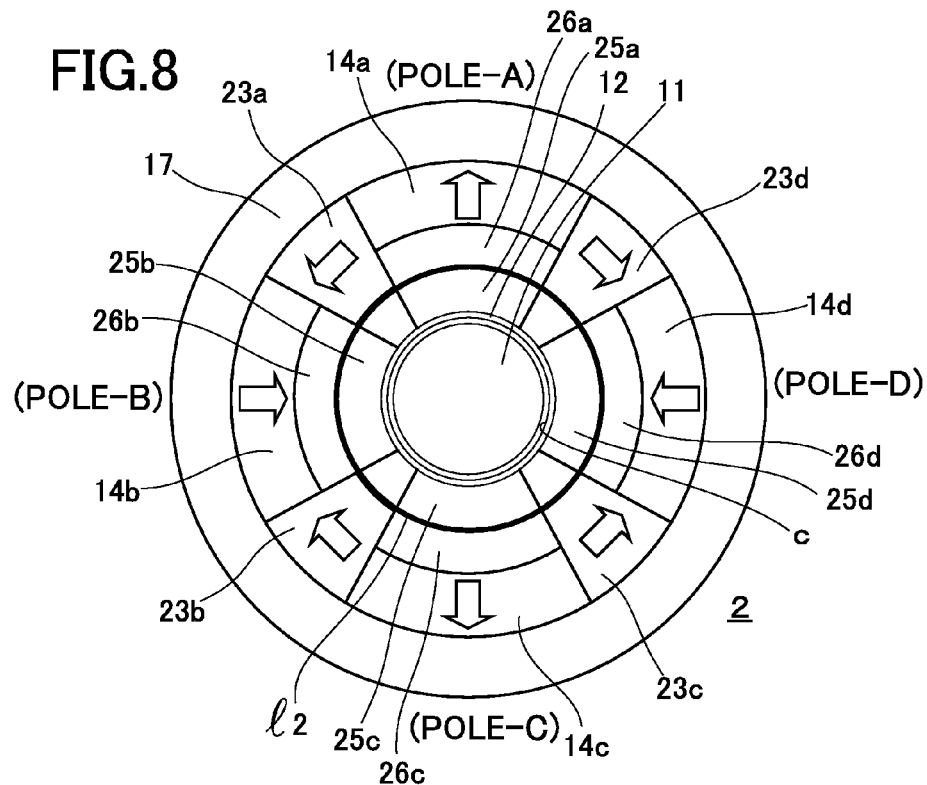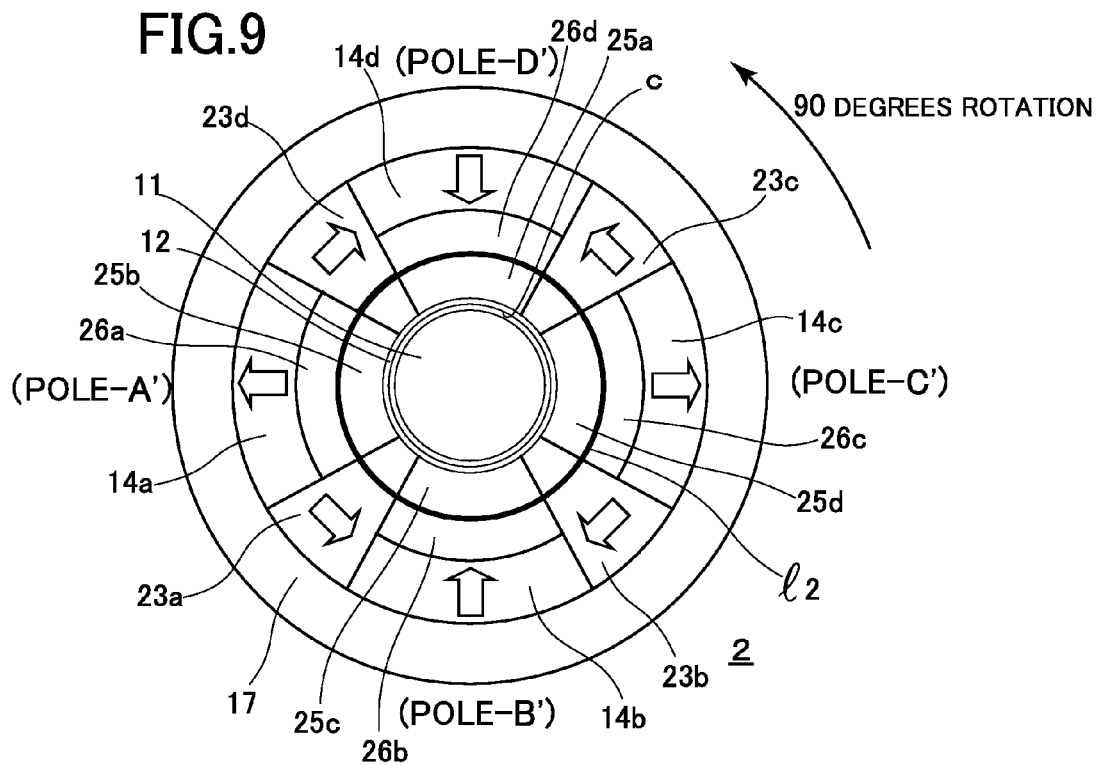

PRODUCTION METHOD FOR ANISOTROPIC BONDED MAGNET AND PRODUCTION APPARATUS FOR SAME

TECHNICAL FIELD

The present invention relates to a production method and a production apparatus that are suitable for producing high performance annular anisotropic bonded magnet.

BACKGROUND ART

An anisotropic bonded magnet (referred also to as "bonded magnet" hereinafter), which is obtained by compressively molding a compound comprised of rare-earth anisotropic magnet powder and binder resin, has various advantages such as that a large magnetic flux density can be obtained even in small size and the degree of freedom is large in molding, for example, in making a thin magnet. For this reason, demand for bonded magnets is increasing as permanent magnets for field magnets to be used for multi-pole motors, which are required to output high power and conserve energy as well as to be reduced in size and weight. In accordance with such an increase in demand, request for reducing the cost of bonded magnets is also growing.

Rare elements (such as rare-earth elements) as the main raw materials for bonded magnets may not be available in low cost. In this regard, in order to allow for price reduction, it is important to enhance the mass production ability for bonded magnets. In particular, it may be important to reduce an amount of time required for producing one bonded magnet (so-called takt time). For reducing the takt time, it is effective to improve the efficiency in alignment step (magnetic alignment step) and molding step (referred also to as "molding step in magnetic field" in combination), which require long time for one step (process time), among production steps for bonded magnets.

Here, the alignment step is a step that applies a magnetic field (aligning magnetic field) to a compound filled in a cavity of a molding die thereby to align constituent particles of the anisotropic magnetic powder in directions of magnetization easy axes. Rare-earth anisotropic magnet powder in itself fundamentally has large magnetic coercive force and sometimes may thus be difficult to be aligned. However, constituent particles thereof (referred also to as "magnetic particles" hereinafter) are enabled to rotate or move in the softened or molten binder resin, so that the magnetization easy axes of crystals are to be aligned to the direction of the aligning magnetic field. Such an alignment step is necessary for obtaining an anisotropic bonded magnet with high magnetic flux density. However, unlike a magnetizing step and an incorporating step, each process of softening the binder resin such as by heating the compound and aligning (moving) the magnetic particles requires necessarily a commensurate amount of time. Therefore, it is difficult to significantly reduce the takt time merely by reducing the process time of the alignment step.

To this end, it is effective for reducing the takt time to increase the number of objects to be processed in one alignment step (to perform so-called multiple cavity process) thereby reducing the average process time for one bonded magnet. For this operation, if the conventional facilities are drastically changed or the apparatus is scaled-up, the production cost is rather raised and bonded magnets may not be produced in low cost. Accordingly, in order to increase the number of objects to be processed in the molding step in magnetic field while taking advantage of the conventional facilities, it is effective to reduce the size of processing space required for one bonded magnet (compact thereof). In this respect, it may be considered to substitute a permanent magnet for a conventionally used magnet coil (electromagnet) to apply the aligning magnetic field. Relevant descriptions are disclosed in PTL (Patent Literature) 1 to PTL 5, for example.

CITATION LIST

Patent Literature

[PTL 1]
Japanese Examined Patent Publication No. 2-59993
[PTL 2]
Japanese Unexamined Patent Application Publication No. 8-111337
[PTL 3]
Japanese Unexamined Patent Application Publication No. 2004-23085
[PTL 4]
Japanese Unexamined Patent Application Publication No. 11-87164
[PTL 5]
WO 2006/1304

SUMMARY OF INVENTION

Technical Problem

PTL 1 proposes to produce a four-pole compact using a molding apparatus in magnetic field, in which first permanent magnets having magnetic directions in radial directions and second permanent magnets having magnetic directions in circumferential directions are alternately arranged around the outer peripheral of a molding die (cavity). According to this apparatus, magnetic leakage fluxes from the first permanent magnets are effectively directed toward the aligning magnetic fields in the radial directions by the second permanent magnets thereby to allow for further efficient alignment.

PTL 1, however, assumes an injection molding or an extrusion molding, and does not relate to a compression molding. Specifically, a compact obtained by the injection molding or the extrusion molding is taken out after certainly being cooled to solidify for the purpose of securing predetermined dimension and preventing deformation, whereas a compact obtained by the compression molding is taken out before the binder resin is cured. In this respect, the case of PTL 1 does not involve problems which would occur in the compact obtained by the compression molding, and PTL 1 has thus different assumption from the case of the compression molding.

PTL 2 proposes to use a permanent magnet as magnetic source for molding a compact in magnetic field and then release the permanent magnet from the compact while rotating the permanent magnet. The compact is thereby demagnetized and can be taken out without being self-collapsed due to its own magnetic force while retaining its shape. However, in order to perform a complex operation such as releasing the permanent magnet from the compact while rapidly rotating the permanent magnet with respect to the compact, a commensurate complex mechanism and space are required. As a result, an apparatus cannot be reduced in size, and the takt time for a bonded magnet is difficult to be reduced due to increase in the number of processes. Note that such a complex operation as the above is for the purpose of performing neutralization such that magnetic flux density B converges to approximately zero like in the electromagnetic neutralizing method performed heretofore (paragraph 0036 in PTL 2).

PTL 3 describes that plural compacts can be obtained at a time by using permanent magnets for aligning magnetic fields while using the conventional size of molding die (paragraph 0026, FIG. 6 and FIG. 7 in PTL 3). However, like the case of PTL 1, PTL 3 does not describe that the compact is taken out from the molding die after the molding in magnetic field and that the takt time for a bonded magnet and the cost thereof can be reduced.

PTL4 describes a molding method for a rare-earth sintered magnet, in which, under the purpose of producing a very small magnet by using reduced-size of facilities, rare-earth-containing alloy powder obtained by spray-granulation is compressively molded into a compact while being aligned using a permanent magnet as magnetic source, and a separated apparatus from the alignment apparatus is then used for neutralizing the compact such that the magnetic field is inverted, thereby allowing the compact to be taken out. PTL 4, however, relates to a very small size of sintered magnet compact rather than relating to a compact of bonded magnet to be taken out before the binder resin is completely cured.

PTL 5 describes a production method for a yoke-integrated rare earth bonded magnet, wherein the spring back is utilized for press-fitting a compact of bonded magnet into a ring-like yoke thereby to integrate both the compact and the yoke without using any adhesive. However, nothing in PTL 5 describes that rare-earth magnet powder constituting the compact is anisotropic magnetic powder, an alignment process is performed, and neutralization or demagnetization is further performed. Furthermore, PTL 5 of course fails to describe that semi-radial alignment is employed and even a permanent magnet is used as a magnetic source, as well as self-collapsing behavior and shape retaining ability of a compact, etc.

The present invention has been created in view of such circumstances, and objects of the present invention include providing a production method for an anisotropic bonded magnet and a production apparatus for the same which are capable of improving the mass production ability for annular anisotropic bonded magnets and reducing the cost thereof.

Solution to Problem

As a result of intensive studies to solve such problems and repeating trial and error, the present inventors have come up with an idea of using a permanent magnet as a magnetic field source for an aligning magnetic field to mold a compact in the aligning magnetic field (molding in magnetic field) when performing an alignment step necessary for producing an annular anisotropic bonded magnet and thereafter relatively rotating the permanent magnet with respect to the obtained compact to perform demagnetization of the compact before discharging the compact. Developing this achievement, the present inventors have accomplished various aspects of the present invention as will be described hereinafter.

<<Production Method for an Anisotropic Bonded Magnet 1>>

(1) The production method for an anisotropic bonded magnet according to the present invention comprises: a filling step that fills an annular cavity with a magnet raw material including one or more types of rare-earth anisotropic magnet powder and a binder resin; an alignment step that applies aligning magnetic fields to the magnet raw material in the annular cavity to cause the rare-earth anisotropic magnet powder to be aligned in the binder resin being in softened state or in molten state, the aligning magnetic fields being applied from an even number of aligning magnetic pole bodies arranged uniformly around outer periphery of the annular cavity such that directions of magnetic fields thereof are alternately reversed, each of the aligning magnetic pole bodies having a permanent magnet as a magnetic field source; a molding step that subjects the magnet raw material during the alignment step or after the alignment step to a molding to obtain an annular compact; and a discharging step that discharges the compact from the annular cavity, and the production method is characterized by further comprising a demagnetizing step that causes the aligning magnetic pole bodies to relatively move with respect to the compact only in circumferential direction after the molding step and before the discharging step to apply demagnetization magnetic fields to the compact, wherein the demagnetization magnetic fields are applied from the aligning magnetic pole bodies with opposite poles to those during the alignment step, and the demagnetization magnetic fields are in directions for cancelling magnetization of the compact caused by the aligning magnetic fields.

(2) According to the present invention, among other advantages, permanent magnets are used as magnetic field sources for aligning magnetic fields thereby allowing a molding die, an apparatus and other components to be made in considerably reduced size for each compact compared to the case of using an electromagnetic coil etc. Therefore, annular anisotropic bonded magnets (referred also to as "bonded magnets") can efficiently be mass-produced while employing facilities with comparable size to conventional ones.

Meanwhile, an annular compact according to the present invention, which is obtained by molding in magnetic fields caused by permanent magnets as magnetic field sources for aligning magnetic fields, is in a state where N-poles and S-poles are alternately distributed around the circumference side surface. If this compact is taken out from the annular cavity (referred also to as "cavity" hereinafter) immediately after the molding without any action, then the compact may possibly be self-collapsed due to attractive forces acting among its own magnetic poles. That is, the compact immediately after the molding step has insufficient shape retaining ability for maintaining its own shape. Of course, it may be possible to sufficiently cool the compact after the molding step in the cavity to solidify the binder resin, or to perform cure thermal process to cure the binder resin if the binder resin is a thermosetting resin, etc. However, such methods are not preferred because they incur some problems such as causing the takt time for a bonded magnet to be increased at least from the viewpoint of the existing technical level.

In this regard, the present invention involves the demagnetizing step that demagnetizes the magnetization of the compact before the discharging step that discharges the compact after the molding step from the cavity. The compact is thereby allowed to be taken out from the cavity while retaining its shape because attractive forces are reduced from acting among its own magnetic poles. Here, the demagnetizing step in the present invention is performed by relatively changing corresponding positions on circumferences of the aligning magnetic pole bodies used in the alignment step and the compact after the molding step. In other words, permanent magnets, which have been used as magnetic field sources for aligning magnetic fields in the alignment step, are utilized in the demagnetizing step as magnetic field sources for demagnetizing magnetic fields to cancel the magnetization having been imparted to the compact in the alignment step.

(3) Essentially, this demagnetizing step merely requires the aligning magnetic pole bodies to be caused to relatively move with respect to the compact in circumferential direction so that corresponding positions on circumferences of the compact and the aligning magnetic pole bodies are relatively changed. For example, in case of a four-pole alternately aligned compact, if the compact is relatively rotated by an angle of 90 degrees (magnetic pole unit angle: i.e. an angle obtained by dividing 360 degrees by the number of poles), which represents one magnetic pole pitch, then the demagnetizing magnetic fields are easily applied to the compact, and the magnetization of the compact can thus be demagnetized. This demagnetizing step eliminates the necessity to move the aligning magnetic pole bodies up-and-down during the alignment step, to rotate a number of times the aligning magnetic pole bodies, and even to rotate in high-speed the aligning magnetic pole bodies while moving them up-and-down. Thus, permanent magnets are used not only as aligning magnetic field sources but as demagnetizing magnetic field sources thereby to allow for reducing the takt time for a bonded magnet and the cost thereof.

Here, while the aligning magnetic pole bodies in the present invention are not required to be rotated a number of times, the rotating amount is not restricted. Note, however, that it is enough if the aligning magnetic pole bodies are rotated by an amount necessary for demagnetizing the compact after the alignment step from the aspect of reducing the takt time for a bonded magnet. In this regard, it is preferred that the demagnetizing step is a step that causes the aligning magnetic pole bodies to relatively rotate with respect to the compact from during the alignment step by an odd multiple of the magnetic pole unit angle that is a minimum angle required for inverting magnetic poles of the aligning magnetic pole bodies arranged around the compact.

It is also preferred that the discharging step is a press-fitting step that press-fits the compact into a tubular body while discharging the compact from the annular cavity, wherein the tubular body is provided coaxially with the annular cavity and has an inner peripheral surface capable of being contacted with the outer peripheral surface of the compact. In the case of manufacturing a product having a tubular body incorporated therein with a bonded magnet, the production steps can be simplified by directly incorporating the compact after the molding step into the tubular body. For example, if the tubular body is a yoke or a housing of motor, air gaps can be reduced between the yoke and the magnet and between the magnet and an armature, thus being preferred.

The "press-fitting" as used herein is engaging a compact that has a larger outer diameter than the inner diameter of a tubular body into the tubular body. The outer diameter of the compact in this case means an outer diameter of the compact in the shape retaining state, which has been solely taken out immediately after being discharged from the annular cavity. Note that the "engaging into" as used herein is a broader concept which includes the above-mentioned "press-fitting" and fitting into a gap, etc. Therefore, the "engaging into" includes the "press-fitting" unless otherwise stated.

Moreover, the compact to be press-fitted may be or may not be an elastic body. If the binder resin has been completely cured (solidified), the press-fitted compact is considered to exhibit a behavior as an elastic body. Specifically, it may be considered that stress caused by the elastic deformation acts between the press-fitted compact and the tubular body to thereby fix the compact to the tubular body. If, on the other hand, the binder resin still remains uncured (unsolidified), the press-fitted compact is considered to only exhibit a behavior as a plastic body or otherwise exhibit a combined behavior of an elastic body and a plastic body. Specifically, it may be considered that the press-fitted compact deforms to follow the inner shape of the tubular body and comes to be in close contact with the inner surface of the tubular body thus being easily fixed thereto.

Note that the "curing" as used herein includes, unless otherwise stated, the case where a binder resin comprised of thermosetting resin is thermally cured as well as the case where a binder resin in softened state or molten state is cooled to be solidified. If the binder resin has been cured (or solidified) at the time of the compact being discharged from the annular cavity, then the above-mentioned demagnetizing step would not necessarily be performed and an anisotropic bonded magnet could be obtained by the production method as below because the compact would already have shape retaining ability.

<<Production Method for an Anisotropic Bonded Magnet 2>>

(1) Other than the above-mentioned production method, the following production method according to the present invention can also achieve the reduction in the takt time for a bonded magnet and the cost thereof.

That is, the present invention may be a production method for an anisotropic bonded magnet, comprising: a filling step that fills an annular cavity with a magnet raw material including one or more types of rare-earth anisotropic magnet powder and a binder resin; an alignment step that applies aligning magnetic fields to the magnet raw material in the annular cavity to cause the rare-earth anisotropic magnet powder to be aligned in the binder resin being in softened state or in molten state, the aligning magnetic fields being applied from an even number of aligning magnetic pole bodies arranged uniformly around outer periphery of the annular cavity such that directions of magnetic fields thereof are alternately reversed, each of the aligning magnetic pole bodies having a permanent magnet as a magnetic field source; a molding step that subjects the magnet raw material during the alignment step or after the alignment step to a molding to obtain an annular compact; and a discharging step that discharges the compact from the annular cavity; the production method being characterized in that the discharging step is an engaging step that engages the compact into a tubular body while discharging the compact from the annular cavity, the tubular body being provided coaxially with the annular cavity and having an inner peripheral surface capable of being contacted with outer peripheral surface of the compact.

(2) In the present invention, the compact after the molding step is received into the tubular body having an inner shape adapted to the outer shape of the compact, thus capable of being discharged from the cavity. In other words, even in the case of a magnetized compact, the compact is ensured to have shape retaining ability caused by the tubular body and prevented from self-collapsing. Here, the tubular body is preferred to be a magnetic tubular body comprised of a magnetic material. The compact engaged into a soft magnetic tubular body (magnetic tubular body) is such that magnetic circuits acting thereon are configured to be smaller than those of the compact being alone or the compact being engaged into a nonmagnetic tubular body comprised of a nonmagnetic material. That is, a magnetic loop becomes small which passes through each magnetic pole and the neighboring magnetic pole formed in the compact after the alignment step. This results in a decrease in mutual magnetic attractive force between neighboring poles to thereby further enhance the shape retaining ability of the compact, so that the self-collapsing of the compact is more effectively prevented. Furthermore, it is preferred that the compact is press-fitted into the tubular body. This is because magnetic loops are efficiently formed without any air gap and the self-collapsing of the compact is more efficiently prevented.

Appearances of such magnetic loops are shown in FIG. 16A and FIG. 16B. FIG. 16A illustrates closed magnetic loops when a compact G after the alignment step is engaged into a soft magnetic tubular body M. FIG. 16B illustrates open magnetic loops of the compact G after the alignment step. Note that the "soft magnetic material" which constitutes a soft magnetic tubular body is not necessarily to be a soft magnetic material in a strict sense and may be magnetized to some extent. It is sufficient to say that the soft magnetic material may be a permanent magnet which has a smaller residual magnetization than that of the compact after the alignment step. In such a sense, the "soft magnetic material" may be rephrased as "magnetic material, while the "soft magnetic tubular body" as "magnetic tubular body".

In any event, providing the engaging step as the above allows the compact to be promptly put out from the cavity even immediately after the molding step, thereby reducing the takt time for a bonded magnet and the cost thereof.

(3) In this case, demagnetization or neutralization is not necessarily required to be performed when the compact after the molding step is discharged from the cavity. It is preferred, however, that the compact is demagnetized or neutralized in consideration of handling of the discharged compact and subsequent steps. To this end, it is preferred that the present invention comprises a neutralizing step that applies, during the engaging step or after the engaging step, neutralizing magnetic fields to the compact engaged into the tubular body, wherein the neutralizing magnetic fields are in directions for cancelling magnetization of the compact caused by the aligning magnetic fields. Alternatively, the neutralization step may be substituted by a combination of the previously-mentioned demagnetization step and engaging step. This allows for preventing foreign substances from attaching to the compact being carried.

Note that "demagnetization" or "neutralization" means to decrease or extinguish the magnetization of the compact formed due to the aligning magnetic field, and they are basically common in concept. Note, however, that the "neutralization" is used herein if substantially complete non-magnetic field is possible, while "demagnetization" is used if complete non-magnetic field is not included. Note also that such substantially complete non-magnetic field is accomplished through performing neutralization by resonant attenuation using so-called neutralization coil and neutralization power source, for example.

(4) The annular anisotropic bonded magnet obtained according to the present invention is preferable for an electric motor for which reduction in size and weight is required, because of exhibiting high magnetic flux density even with thin shape. When being fixed to a yoke (such as housing) of electric motor, the compact may also be adhered using adhesive or other appropriate means. It is preferred, however, that the compact is engaged or press-fitted into the yoke in order for air gaps to be reduced between the yoke and the bonded magnet or between the rotor and stator of the electric motor. In addition, it is preferred that a heat curing treatment (such as cure thermal process) or other appropriate treatment is thereafter employed to integrate the compact i.e. the bonded magnet with the yoke. In this respect, if the above-mentioned soft magnetic tubular body is the yoke (such as housing, case) of electric motor, then the discharging of the compact and the incorporating of the compact into the yoke of electric motor are performed at the same time, which result in the entire takt time reduction thus being preferable.

<<Production Apparatuses for an Anisotropic Bonded Magnet>>

The present invention may be perceived not only as the above-mentioned production methods for an anisotropic bonded magnet but as production apparatuses suitable for implementing them.

(1) That is, the present invention may be a production apparatus for an annular anisotropic bonded magnet, comprising: a hollow cylindrical or solid cylindrical core; a mainly molding die that surrounds the core to form an annular cavity therebetween; and an aligning magnetic pole body that includes an even number of permanent magnets arranged uniformly around and in vicinity of outer periphery of the mainly molding die such that directions of magnetic fields thereof are alternately reversed, the permanent magnets being capable of providing an aligning magnetic field to the annular cavity, the production apparatus being characterized by further comprising a driving means that relatively changes corresponding positions on circumferences of the annular cavity and the aligning magnetic pole body.

(2) Moreover, the present invention may be a production apparatus for an annular anisotropic bonded magnet, comprising: a hollow cylindrical or solid cylindrical core; a mainly molding die that surrounds the core to form an annular cavity therebetween; and an aligning magnetic pole body that includes an even number of permanent magnets arranged uniformly around and in vicinity of outer periphery of the mainly molding die such that directions of magnetic fields thereof are alternately reversed, the permanent magnets being capable of providing an aligning magnetic field to the annular cavity, the production apparatus being characterized by further comprising an engaging means that engages a compact into a tubular body while discharging the compact from the annular cavity, the compact being capable of being molded in the annular cavity, the tubular body being provided coaxially with the annular cavity and having an inner peripheral surface capable of being contacted with outer peripheral surface of the compact.

<<Others>>

(1) The number of magnetic poles formed on the circumference side surface of the annular compact or bonded magnet is not particularly limited so long as being two or more (such as two, four, six, eight, and ten). In consideration of achieving the high performance and efficiency of a device for which the bonded magnet is used and other factors, the number of magnetic poles is preferred to be four or more (such as four, six, eight, and ten).

(2) In addition to the above-mentioned filling step, alignment step and molding step, the production method for an anisotropic bonded magnet according to the present invention may comprise a densification step that further compresses (thermally compresses) the compact to densify it, a hardening heat treatment step (cure thermal process step) that rigidly hardens the thermosetting resin used in the magnet raw material, a magnetizing step that magnetizes the compact to be an annular anisotropic bonded magnet, an anti-corrosion process step, and/or other steps. Each step may be performed independently, or two or more steps may be performed in combination or synchronously. Further, the magnet raw material to be filled in the annular cavity may be a compound obtained by kneading and granulating rare-earth anisotropic magnet powder and binder resin, or a preliminary compact obtained by preliminarily compressively molding a compound comprised of weighed rare-earth anisotropic magnet powder and binder resin, etc.

(3) The molding step according to the present invention may be a compression molding step that compressively molds the magnet raw material filled in the annular cavity using an upper punch and a lower punch, or an injection molding step that injects a magnetic raw material to be filled in an annular cavity, which is formed by a movable die and a fixed die, and then cools the magnet raw material to solidify it. Further, the binder resin is not limited to a thermosetting resin, and a thermoplastic resin may also be used.

(4) The "softened state" or "molten state" as used in the present invention is not to be strictly distinguished. In essence, it is enough if a resin is heated to reduce its viscosity thereby leading to a state where each particle of the rare-earth anisotropic magnet powder is possible to rotate, move or perform other actions.

(5) The "aligning magnetic pole bodies" as used in the present invention are configured such that each of them has a permanent magnet as a magnetic field source, even number of them are arranged uniformly around outer periphery of the annular cavity, and directions of magnetic fields thereof are alternately reversed, while any one of the aligning magnetic pole bodies causes a magnetic field in radial direction to the annular cavity. These aligning magnetic pole bodies can change or invert the directions of magnetic fields to be applied to the annular cavity between during the alignment step and during the demagnetizing step. Therefore, in the present invention, the aligning magnetic pole bodies are considered to exclude ones that merely apply preferable magnetic fields in radial directions to the annular cavity during either the alignment step or the demagnetizing step. If falling within such a scope, each aligning magnetic pole body may consist of a permanent magnet as a magnetic field source or may be a combination of a permanent magnet and a yoke which transfers the magnetic field from the permanent magnet. A single permanent magnet or a plurality of permanent magnets may be used, and if a plurality of permanent magnets are used, then a single type or a plurality of types may be possible in terms of their forms and materials.

Note that using permanent magnets as magnetic sources of the aligning magnetic pole bodies allows rapid switching from the alignment step to the demagnetizing step to thereby easily reduce the takt time for a bonded magnet. With respect to the permanent magnets and yokes which constitute the aligning magnetic pole bodies, various materials, forms and combinations, etc. may be suitably selected depending on the stress level to be acted from the mainly molding die during the compression molding.

(6) The "aligning" or "alignment" as used in the present invention means that magnet particles are aligned such that magnetization easy axes thereof are directed along the aligning magnetic fields, and specific alignment conditions are not limited. If an even number of aligning magnetic pole bodies are arranged uniformly and directions of magnetic fields thereof are alternately reversed as described in the above, then the alignment causes alternating two kinds of regions, i.e. one or more first regions comprising magnet particle groups where magnetization easy axes are arranged and distributed outward in radial directions and one or more second regions comprising magnet particle groups where magnetization easy axes are arranged and distributed inward in radial directions. Conversely to say, it is enough if at least such first regions and second regions are formed, and more specific alignment conditions are not required. Therefore, alignment conditions caused in transition regions among those regions are also not limited. Note, however, that if the bonded magnet according to the present invention is used for a field magnet of a motor etc. and the magnet particles are distributed in the transition regions such that directions of magnetization easy axes are smoothly changed, then the output of the motor may be improved and stabilized, thus being preferable. In this regard, the alignment as used in the present invention is preferred to be so-called semi-radial alignment (as will be defined later).

(7) The "tubular body" as used in the present invention may be such that the outer shape thereof (cross-sectional outer shape) is any of a circle, a square, a polygon and other appropriate shapes if the tubular body has an inner shape (tubular inner shape) which the annular compact can be engaged into. Moreover, the inner shape of the "tubular body" is not limited to merely being cylindrical inner surface shape and may also be "angled-type" shape having one or more convex portions (supporting portions).

(8) The "annular cavity" may be such that the cross-sectional shape in the axial direction is annular as well as square or polygonal such as hexagonal or octagonal. Similarly, the "mainly molding die" may be such that the cross-sectional shape in the axial direction is annular as well as square or polygonal such as hexagonal or octagonal. Various shapes may fall within the scope of the present invention without departing from the spirit of the present invention.

BRIEF DESCRIPTION OF DRAWINGS

FIG. 4 is a cross-sectional view illustrating an aligning magnetic field caused by the molding die.

FIG. 5 is a cross-sectional view illustrating a demagnetizing magnetic field when the molding die is rotated by the angle of one magnetic pole pitch.

FIG. 8 is a cross-sectional view of a molding die according to a second example.

FIG. 9 is a cross-sectional view when the molding die is rotated by an angle of one magnetic pole pitch.

REFERENCE SIGNS LIST

Figure 1:
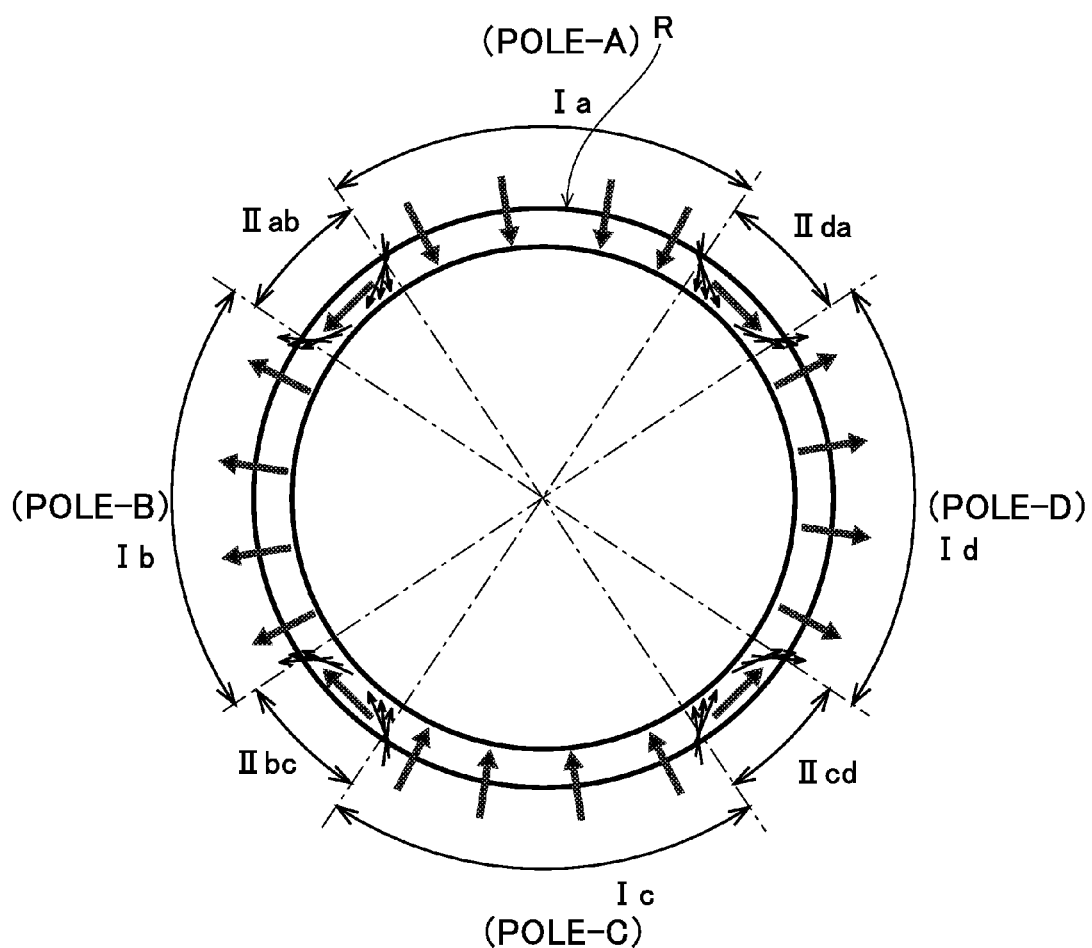
FIG. 1 is a cross-sectional view illustrating semi-radial alignment in a ring-like bonded magnet.

1; molding die
11; core
12; mainly molding die
13; intermediate yoke
14; main permanent magnet (aligning magnetic pole body)
15; first subsidiary permanent magnet
16; second subsidiary permanent magnet
17; back yoke
c; annular cavity
G; compact
M; soft magnetic tubular body

DESCRIPTION OF EMBODIMENTS

The present invention will be described more in detail with reference to embodiments thereof. The contents described herein may be associated not only with production methods for an anisotropic bonded magnet but with production apparatuses for the same. One or more constitutional elements freely selected from the constitutions described herein may be added to the above-mentioned constitutions of the present invention. Entities regarding methods, when understood as a product-by-process, may also be entities regarding "products".

(1) Magnet Raw Material

Magnet raw material comprises one or more types of rare-earth anisotropic magnet powder and a binder, resin. Specifically, the magnet raw material is in the form of, for example, mixed powder of rare-earth anisotropic magnet powder and resin powder, a compound obtained by heating and kneading the mixed powder, a preliminary compact obtained by compressively molding the mixed powder and/or the compound, and/or a mixture of rare-earth anisotropic magnet powder and molten resin, etc. Note, however, that the magnet raw material may contain, in addition to rare-earth anisotropic magnet powder and resin, any agent such as lubricant agent, curing agent, curing assist agent and surface-activating agent.

The composition, type and other properties of rare-earth anisotropic magnet powder are not limited, and any of magnet powder known in the art may be employed. Representative examples of rare-earth anisotropic magnet powder include, for example, Nd—Fe—B based magnet powder, Sm—Fe—N based magnet powder, SmCo based magnet powder and other magnet powder. Such magnet powder may be produced by the so-called rapid solidification method, hydrogenation disproportionation desorption recombination method (HDDR method) or dynamic HDDR method (d-HDDR method). One type of rare-earth anisotropic magnet powder may be used or a plurality of types may also be used. For example, coarse powder with relatively large average particle diameter (e.g. 1 to 250 micrometers) may be mixed with fine powder with relatively small average particle diameter (e.g. 1 to 10 micrometers). Moreover, the magnet raw material may contain magnet powder other than rare-earth anisotropic magnet powder. Examples thereof include various types of isotropic magnet powder, ferrite magnet powder and other appropriate magnet powder.

As the binder resin, known materials in the art may be used, such as rubber. Examples thereof include thermosetting resins, such as epoxy resin, unsaturated polyester resin, amino resin, phenol resin, polyamide resin, polyimid resin, polyamide-imide resin, urea resin and melamine resin. Existence form of the binder resin is not limited. For example, the binder resin in powder-like form may adhere to the particle surface of the rare-earth anisotropic magnet powder, or in film-like form thereon. In addition, the binder resin may be in softened state or molten state during the alignment step thereby to assist the alignment of the rare-earth anisotropic magnet powder. Binder resin to be softened or molten by being heated is ordinarily used, but binder resin in softened state or in molten state even in room temperature may also be used. If the anisotropic bonded magnet is obtained through injection molding, the binder resin may also be thermoplastic resin.

In order to improve releasability of the compact, adjustment of molding timing, wettability and/or adhesiveness between the magnet powder and the molten resin and other properties, various additive agents may also be compounded with little amount. Examples of such additive agents include various types of metallic soaps, lubricant agent such as alcohol based lubricant agent, titanate based or silane based coupling agent, various types of curing agents, various types of curing accelerator, and other agents.

Mixture fraction of the rare-earth anisotropic magnet powder and the resin in volume ratio is approximately such that the magnet powder is 76 to 90 volume percent while the sum of the resin and additive agents is 10 to 24 volume percent. In terms of mass ratio, the magnet powder is about 90 to 99 mass percent while the sum of the resin and additive agents is about 1 to 10 mass percent.

(2) Anisotropic Bonded Magnet

The anisotropic bonded magnet according to the present invention is not limited with regard to its size, magnetic characteristic and use, etc, so long as being tubular, annular or circular. Typical use is for a field magnet of a motor. Examples of such a motor include direct-current (DC) motor, alternate-current (AC) motor and other appropriate motors. Location where the anisotropic bonded magnet is provided may be on the rotor side or stator side, or on the inner surface side or outer surface side to the stator.

EXAMPLES

<<Anisotropic Bonded Magnet>>

(1) As one example of the anisotropic bonded magnet according to the present invention, a thin and annular permanent magnet for field magnet provided in the housing of a four-pole DC brush motor will be mentioned. Specifically, the permanent magnet for field magnet is a ring-like bonded magnet R which has a cross-section as shown in FIG. 1. The ring-like bonded magnet R is obtained by subjecting a compound (magnet raw material) comprising Nd—Fe—B based rare-earth anisotropic magnet powder (referred also to as "magnet powder") and a binder resin to filling, heating, aligning, compressing, molding, heat-curing and magnetizing. This ring-like bonded magnet R is formed with four magnetic poles (pole-A to pole-D) on its circumferential side surface by means of semi-radial alignment. Each magnetic pole comprises a main pole portion Ia, Ib, Ic, Id and a transition portion IIab, IIbc, IIcd, IIda that is formed between neighboring two main pole portions. Arrows in FIG. 1 represent directions (directions of magnetization easy axes) where constituent particles (magnet particles) of the ring-like bonded magnet R are aligned in respective main pole portions and transition portions.

(2) The "aligning" or "alignment" as used herein means that constituent particles (magnet particles) of the rare-earth anisotropic magnet powder are affected by the aligning magnetic fields to move or rotate and magnetization easy axes thereof are aligned so as to be directed along the aligning magnetic fields. The "semi-radial alignment" means that the magnet particles are distributed in the main pole portions such that the magnetization easy axes are directed in normal directions of the circumferential side surface while the magnet particles are distributed in the transition portions such that the magnetization easy axes are gradually directed in circumferentially tangential directions as they come close to neutral positions, and after being in the circumferentially tangential directions at the neutral positions, they are gradually directed in the normal directions of the circumferential side surface as they are separated from the neutral positions. The semi-radial alignment is different from the radial alignment, which causes all the magnetization easy axes to be directed in radial directions, in the point that the directions of the magnetization easy axes change depending on their positions. Note that, even in the semi-radial alignment, the directions of the magnetization easy axes of the magnet particles are caused to smoothly change rather than critically changing in the vicinity of the borders between the main pole portions and the transition portions.

<<Production of Anisotropic Bonded Magnet>>

Production method for the ring-like bonded magnet R and relevant techniques are known in the art and described in detail in the previously-mentioned PTL 3, for example. The description will hereinafter be directed mainly to contents that are related to the present invention. That is, detailed description will be made primarily for molding dies or methods which use permanent magnets as the aligning magnetic field sources to allow for retaining the shape of a compact which has been subjected to molding in magnetic field, while discharging the compact.

Example 1

Figure 2:
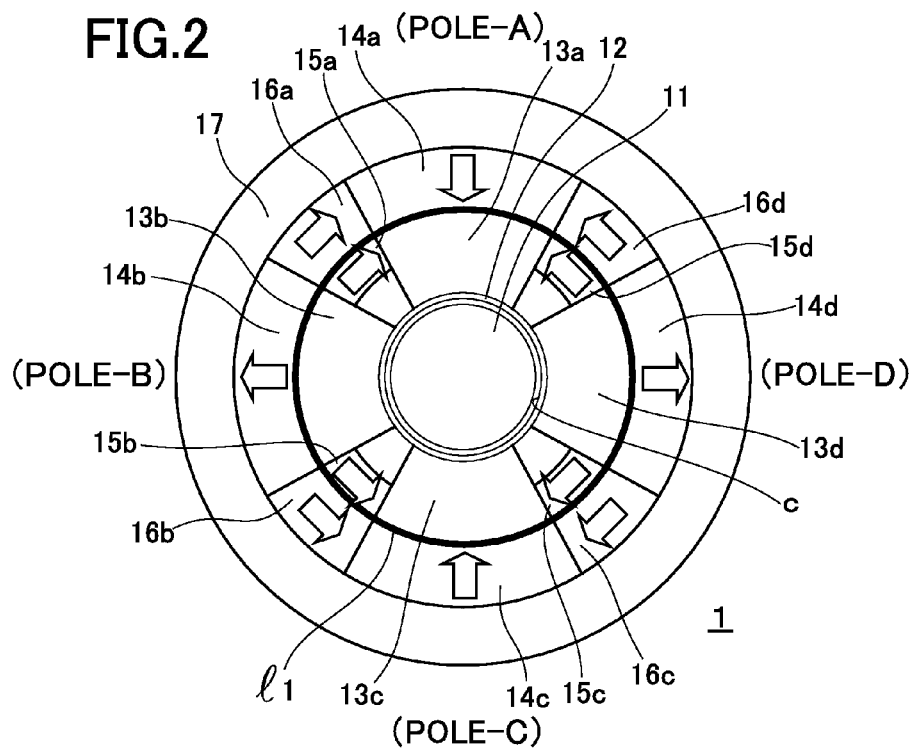
FIG. 2 is a cross-sectional view of a molding die according to a first example.

(1) FIG. 2 illustrates a cross-section of molding die 1 which may be used for the production method of the present invention. It should be appreciated that FIG. 2 exemplarily illustrates only one molding die 1, but an actual production apparatus may involve dice in which such space-saving plural molding dies 1 are arranged in every direction. This allows multiple compacts to be obtained in a small space.

(2) The molding die 1 comprises: a solid cylindrical core 11 that is comprised of a magnetic material and concurrently acts as a center yoke; a hollow cylindrical mainly molding die 12 that is provided coaxially around the outer periphery of the core 11 and comprised of a nonmagnetic material; fan-shaped four intermediate yokes 13a, 13b, 13c and 13d (referred representatively to as "intermediate yoke or yokes 13") that are arranged uniformly around the outer peripheral surface side of the mainly molding die 12 and each comprised of a magnetic material; fan-shaped main permanent magnets 14a, 14b, 14c and 14d (referred representatively to as "main permanent magnet or magnets 14") that are arranged around the outer peripheral surface side of the respective intermediate yokes 13; fan-shaped first subsidiary permanent magnets 15a, 15b, 15c and 15d (referred representatively to as "first subsidiary permanent magnet or magnets 15") that are interposed in gaps between neighboring intermediate yokes 13a, 13b, 13c and 13d so as to be flush with the outer peripheral side surfaces thereof; fan-shaped second subsidiary permanent magnets 16a, 16b, 16c and 16d (referred representatively to as "second subsidiary permanent magnet or magnets 16") that are provided at the outer peripheral sides of respective first subsidiary permanent magnets 15 and interposed in gaps between neighboring main permanent magnets 14 so as to be flush with the outer peripheral side surfaces thereof; and a hollow cylindrical back yoke 17 that is provided in contact with the outer peripheral side surfaces of the main permanent magnets 14 and the second subsidiary permanent magnets 16.

The core 11 and the mainly molding die 12 form an annular cavity c (circular cavity, tubular cavity). Hollow cylindrical upper punch and lower punch (not shown) provided coaxially with the annular cavity c compressively mold the compound filled in the annular cavity c, and an annular compact to be the ring-like bonded magnet R is thereby obtained.

The main permanent magnets 14 represent the aligning magnetic pole bodies in the present invention. Aligning magnetic fields are applied from the main permanent magnets 14 through the intermediate yokes 13 to the annular cavity c. In this respect, the intermediate yokes 13 may also be considered as being included in the aligning magnetic pole bodies. Here, the mainly molding die 12 is comprised of nonmagnetic material, so that the magnetic circuits are not short-circuited in the mainly molding die 12, and the aligning magnetic fields are ensured to be delivered to the annular cavity c. If, however, the mainly molding die 12 is of magnetic material, then magnetization easy axes in the transition portions will be caused to change more continuously and more smoothly when the compact is semi-radially aligned. In this regard, it is preferred that the mainly molding die 12 is of magnetic material rather than of nonmagnetic material. Each main permanent magnet 14 has N-pole and S-pole in its radial direction while each two neighbors of the main permanent magnets 14a, 14b, 14c and 14d are such that polarities are opposite. Unfilled arrows in FIG. 2 show directions of the aligning magnetic fields formed by these main permanent magnets 14.

The first subsidiary permanent magnets 15a, 15b, 15c and 15d and the second subsidiary permanent magnets 16a, 16b, 16c and 16d suppress magnetic flux leakage in the circumference directions of the intermediate yokes 13 and the main permanent magnets 14. To this end, each of the first subsidiary permanent magnets 15 and second subsidiary permanent magnets 16 has N-pole and S-pole in its circumference direction. Specifically, if, for example, the intermediate yoke 13a and the main permanent magnet 14a form an aligning magnetic field toward the center of the annular cavity c, in which case their N-poles are located at the inner peripheral sides while S-poles are located at the outer peripheral sides, then N-poles of the first subsidiary permanent magnets 15a and 15d and the second subsidiary permanent magnets 16a and 16d are arranged at inner sides (opposing sides) while the S-poles thereof are arranged at outer sides (back sides) so that magnetic fields are formed to cause that aligning magnetic field to be interposed therebetween. This suppresses the aligning magnetic field, which is caused by the intermediate yoke 13a and the main permanent magnet 14a, from leaking toward circumference direction, and the aligning magnetic field is thus converged to the center of the annular cavity c. The same applies to the relationships of other intermediate yokes 13, main permanent magnets 14, first subsidiary permanent magnets 15 and second subsidiary permanent magnets 16.

Here, the first subsidiary permanent magnets 15 or the second subsidiary permanent magnets 16 contribute to the alignment of magnet powder, but basically do not contribute to the formation of demagnetization fields which will be described later. In this regard, the present example deems the first subsidiary permanent magnets 15 and the second subsidiary permanent magnets 16 not to be included in the "aligning magnetic pole bodies".

The back yoke 17 magnetically connects outer peripheral surfaces of the main permanent magnets 14 with one another to thereby form closed magnetic circuits in the molding die 1. While the hollow back yoke 17 is individually provided in the present example, one or more back yokes may be shared by multiple molding dies.

Figure 3:
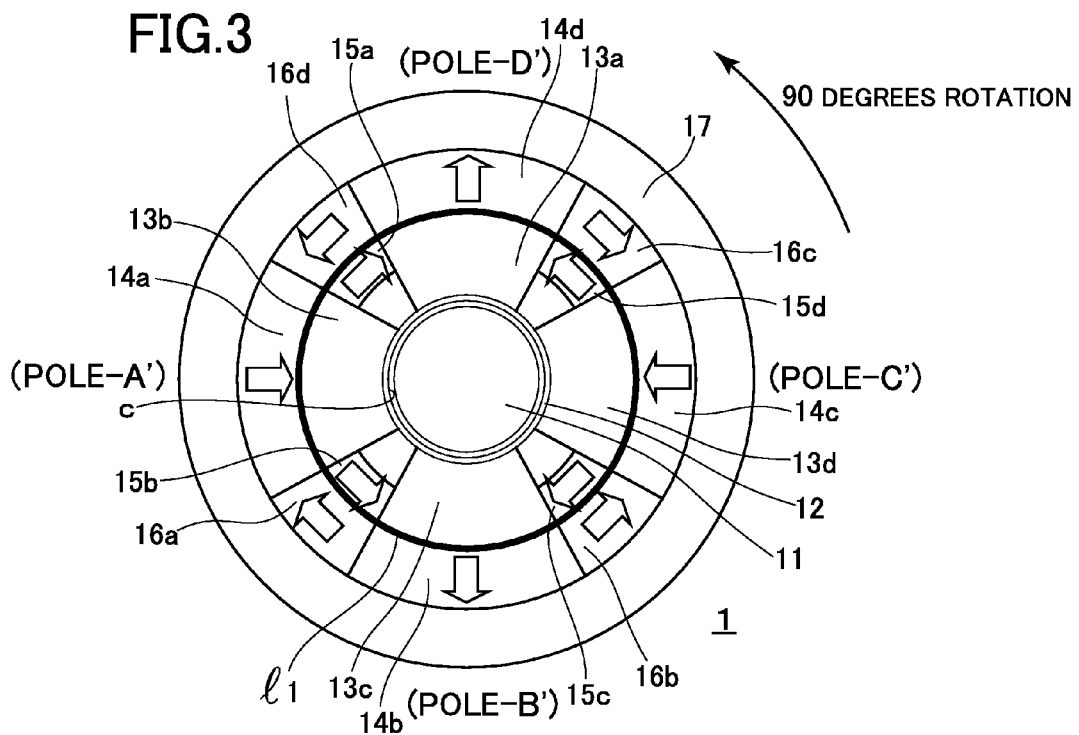
FIG. 3 is a cross-sectional view when the molding die is rotated by an angle of one magnetic pole pitch.

(3) The molding die 1 is divided into inner parts that comprise the intermediate yokes 13 and the first subsidiary permanent magnets 15, and outer parts that comprise the main permanent magnets 14 and the second subsidiary permanent magnets 16. Divided inner parts and outer parts can be rotated relatively to each other with respect to a circular dividing line 11 (el one). The present example is such that the inner parts are fixed parts while the outer parts are movable parts. Note that the back yoke 17 is therefore movable in the present example, but the back yoke 17 may rather be fixed. FIG. 3 illustrates a state where the movable parts are rotated to the left by 90 degrees (magnetic pole unit angle). This causes the directions of magnetic fields applied to the annular cavity c to be reversed, and new magnetic poles (pole-A' to pole-D') are formed. Note that the movable parts may be directly driven by a motor provided with an encoder and other necessary components to be capable of controlling the rotation angle, or indirectly driven via an appropriate transmission mechanism, such as gears and toothed belt, which cooperates with the motor. Such a rotation angle controllable motor represents the driving means in the present invention.

It may be understood that directions of circumferential magnetic fields of the first subsidiary permanent magnets 15 and the second subsidiary permanent magnets 16 which are neighboring in the radial directions are caused to oppose each other (to be directions cancelling the magnetic fluxes) by the 90 degrees rotation of the movable parts. For this reason, the magnetic fields exiting in the radial direction from the intermediate yokes 13 and the main permanent magnets 14 are less converged by the first subsidiary permanent magnets 15 and the second subsidiary permanent magnets 16, thus being reduced relative to the magnetic fields before the movable parts are rotated by 90 degrees. Filled arrows in FIG. 4 represent an aligning magnetic field (magnetic flux) to the annular cavity c before the movable parts are rotated. In addition, filled arrows in FIG. 5 represent a demagnetizing magnetic field (magnetic flux) to the annular cavity c after the movable parts are rotated. Note that FIG. 4 and FIG. 5 exemplarily illustrate only a quarter portion of the molding die 1, while the same applies to the other portions. If even such less demagnetizing magnetic fields than the aligning magnetic fields are provided in the opposite directions to those of the aligning magnetic fields, the compact is inevitably demagnetized (as previously described) thereby not to collapse, and this has been confirmed.

Using this molding die 1, the molding and the discharging of a compact is performed in the following manner. The molding die 1 is initially set in an arrangement shown in FIG. 2 or FIG. 4 (referred to as "aligning arrangement"), and the annular cavity c is filled with the compound (filling step). This filled compound is heated to be subjected to alignment (alignment step). The magnet raw material in this state is compressively molded and a compact is thereby obtained (molding step).

Subsequently, the molding die 1 is set in an arrangement after rotation as shown in FIG. 3 or FIG. 5 (referred to as "demagnetizing arrangement"). This causes the compact having been magnetized to be applied thereto with magnetic fields in opposite directions (demagnetizing fields). During this operation, magnetization of the compact is significantly demagnetized compared to that immediately after the molding even if some magnetization would remain in the compact (demagnetizing step, neutralizing step). After this demagnetization, the lower punch is raised up thereby to easily discharge the compact from the annular cavity c (discharging step), and the compact is unlikely to self-collapse due to its own magnetic force.

(4) If, as shown in FIG. 4 and FIG. 5, the rotation angle of the movable parts of the molding die 1 is an angle for one magnetic pole pitch formed by the intermediate yokes 13 and the main permanent magnets 14 (magnetic pole unit angle: 90 degrees in the present example) or an odd multiple thereof, then the aligning magnetic fields (magnetic fluxes) and the demagnetizing magnetic fields (magnetic fluxes) are different in magnitude, but directions thereof are absolutely opposite. Therefore, the magnetization of the compact having been caused by the aligning magnetic fields is efficiently demagnetized by the demagnetizing magnetic fields across the entire area.

Figure 6:
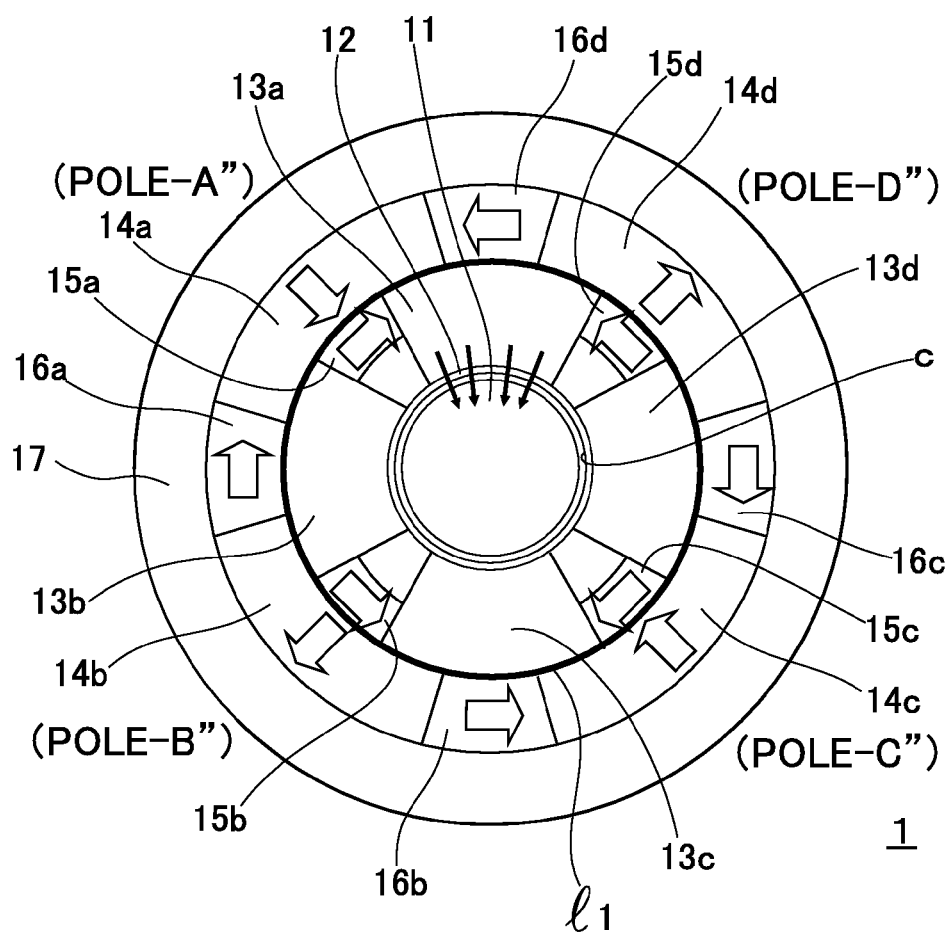
FIG. 6 is a cross-sectional view illustrating a demagnetizing magnetic field when the molding die is rotated to the middle between magnetic poles.

Here, it may be considered to rotate the movable parts of the molding die 1 by an intermediate angle (zero to 90 degrees) less than the magnetic pole unit angle (90 degrees in the present example) from the position (reference position) shown in FIG. 2 or FIG. 4. Such cases also fall within the scope of the present invention. However, if the movable parts of the molding die 1 are rotated by such an intermediate angle, there may be caused partially demagnetized portions and partially not demagnetized portions, or no magnetization occurs. For example, in view of the magnetic field in the upper one magnetic pole shown in FIG. 6, the magnitude thereof is less than that of the case shown in FIG. 4 while the direction thereof is the same as the aligning direction shown in FIG. 4. In such a case, no demagnetization occurs. Therefore, if the movable parts of the molding die 1 is rotated by an intermediate angle (zero to 90 degrees), then the demagnetization will be insufficient for the entire of the compact, thus deteriorating the shape retaining ability. As such, it may be understood that the movable parts of the molding die 1 is preferably rotated such that the demagnetizing magnetic fields are directed to absolutely oppose the aligning magnetic fields (by an odd multiple of the magnetic pole unit angle (90 degrees) as the angle between neighboring two magnetic poles in the present example).

Figure 7:
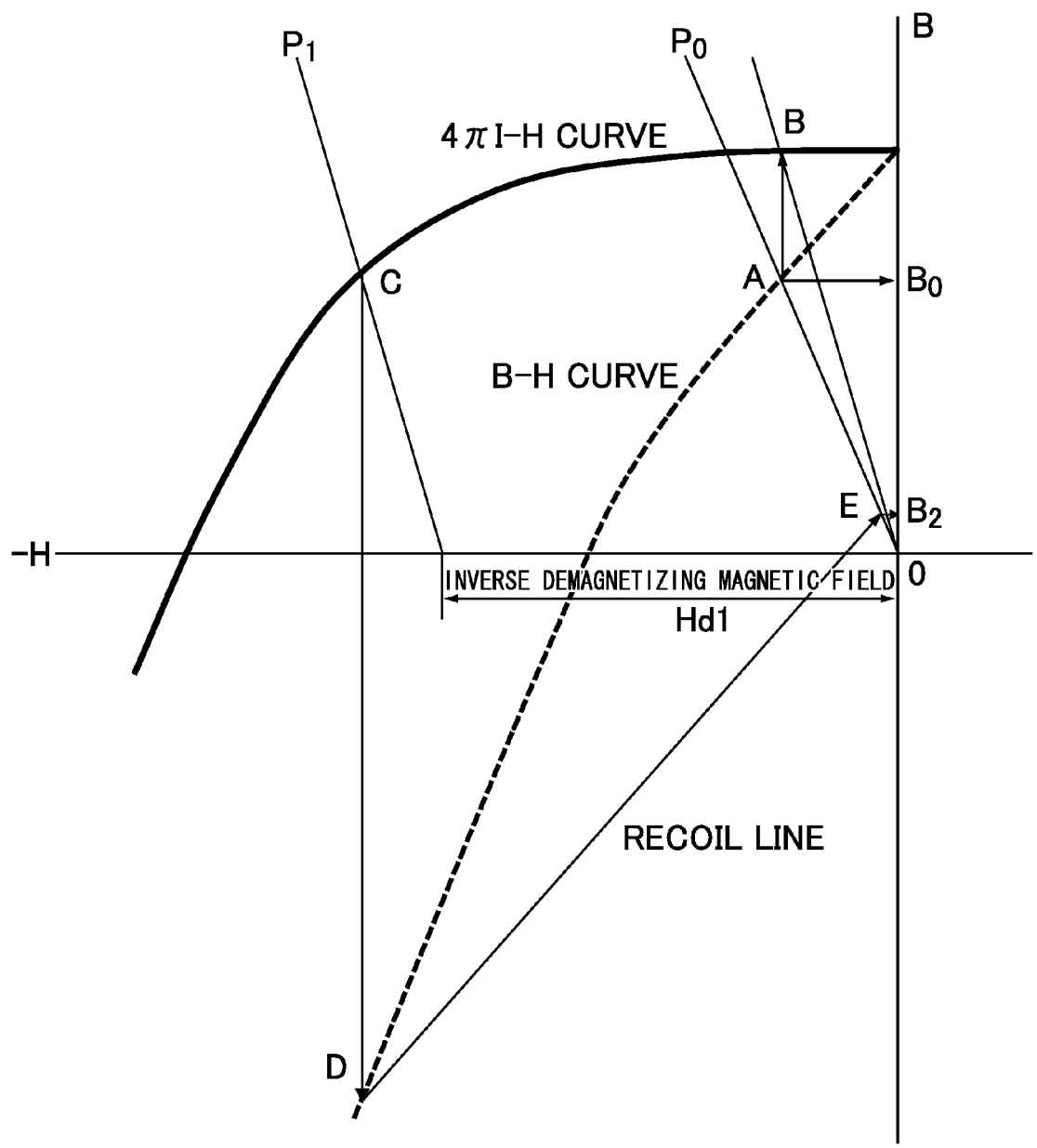
FIG. 7 is a graph illustrating a demagnetization curve.

(5) When the movable parts of the molding die 1 is rotated from the reference position (position shown in FIG. 2 or FIG. 4) to an inverse position where the directions of magnetic fields acting on the annular cavity c are reversed (position shown in FIG. 3 or FIG. 5), the demagnetizing amount (decreased amount of magnetic flux density) can be estimated using a demagnetization curve (the second quadrant of magnetization curve). This will be described with reference to FIG. 7. FIG. 7 illustrates a B-H curve as the magnetization curve, a $4\pi$I-H curve, and operating lines based on permeance coefficient. The permeance coefficient P is an inclination between the internal magnetic field (demagnetizing magnetic field) Hd of the magnetized compact and the magnetic flux density Bd exiting from the compact (P=Bd/Hd), which is approximately fixed depending on the shape of the magnetized compact (magnet shape) and other factors.

It is first assumed that no external magnetic field acts on the compact. Permeance coefficient $P_0$ is used, which is determined by the shape of the magnetized compact, as the basis for drawing an operating line $P_0$ on the demagnetization curve shown in FIG. 7. The operating point at this situation is given as the intersection point A between the operating line $P_0$ and the B-H curve. The magnetic flux density exiting from the compact at this situation is $B_0$. The intersection point B between the vertical line rising from the operating point A and the 4πI-H curve represents the magnetizing force of the magnetized compact in consideration of its self-demagnetizing field when no external magnetic field acts on the compact.

It is then assumed that demagnetizing magnetic field (external magnetic field) Hd1 acts on the compact immediately after the molding. The magnetizing force of the compact at this situation is represented by the intersection point C between an operating line $P_1$ drawn parallel to the straight line O-B and the 4πI-H curve. The intersection point D between the vertical line falling from the point C and the B-H curve provides the operating point when the demagnetizing magnetic field Hd1 acts on the compact. If the compact is discharged from this situation so that the effect of the demagnetizing magnetic field Hd1 is eliminated, then the operating point moves on a recoil line to be at the intersection point E on the operating line $P_0$. The magnetic flux density exiting from the compact at this intersection point E is $B_2$. In the result, the compact has been irreversibly demagnetized with an amount equivalent to the magnetic flux density ($B_0$-$B_2$) by the demagnetizing magnetic field acting. In other words, if a compact having been molded in the magnetic field is taken out after being acted by the demagnetizing magnetic field, then the demagnetization amount of the compact comes to be the magnetic flux density ($B_0$-$B_2$). Note that this demagnetization amount may be affected by changes in temperature of the compact. Here, the demagnetization amount of the compact has been evaluated on the assumption that each step of the heat aligning, molding and discharging is performed during short time at approximately the same temperature.

Example 2

FIG. 8 and FIG. 9 illustrate a molding die 2 as another example. The molding die 2 is configured to have its inner parts and outer parts which are relatively rotatable with respect to dividing line l2 (el two) located at further inner peripheral side than that of the molding die 1. The present example is such that the inner parts are fixed parts while the outer parts are movable parts. FIG. 8 illustrates an arrangement of the molding die 2 when being applied thereto with aligning magnetic fields (aligning arrangement). FIG. 9 illustrates an arrangement of the molding die 2 when being applied thereto with demagnetizing magnetic fields (demagnetizing arrangement). The demagnetizing arrangement of FIG. 9 is obtained by rotating to the left the aligning arrangement of FIG. 8 by 90 degrees.

This molding die 2 is different from the molding die 1 in the following aspects. First, subsidiary permanent magnets 23a, 23b, 23c and 23d (referred representatively to as "subsidiary permanent magnet or magnets 23") of the molding die 2 are such that the first subsidiary permanent magnets 15a, 15b, 15c and 15d and the second subsidiary permanent magnets 16a, 16b, 16c and 16d of the molding die 1 are integrated, respectively. In contrast, first intermediate yokes 25a, 25b, 25c and 25d (referred representatively to as "first intermediate yoke or yokes 25") and second intermediate yokes 26a, 26b, 26c and 26d (referred representatively to as "second intermediate yoke or yokes 26") of the molding die 2 are such that the intermediate yokes 13a, 13b, 13c and 13d of the molding die 1 are respectively divided into inner peripheral sides and outer peripheral sides with respect to the dividing line l2. Other common components for the molding die 1 and the molding die 2 shown in FIG. 8 and FIG. 9 are identified using the same reference numerals as those in FIG. 2 and FIG. 3.

In the present example, even if the movable parts are rotated by an angle for one magnetic pole pitch (90 degrees in the present example) or an odd multiple thereof, the positional relationship of the main permanent magnets 14 and the subsidiary permanent magnets 23 remains for any of poles. For this reason, if the movable parts of the molding die 2 are rotated as shown in FIG. 9, the demagnetizing magnetic fields acting on the annular cavity c are such that the strengths thereof are the same as those of the aligning magnetic fields but the directions are absolutely opposite. Therefore, using the molding die 2 rather than the molding die 1 allows the magnetized compact to be efficiently demagnetized.

Example 3

Figure 10:
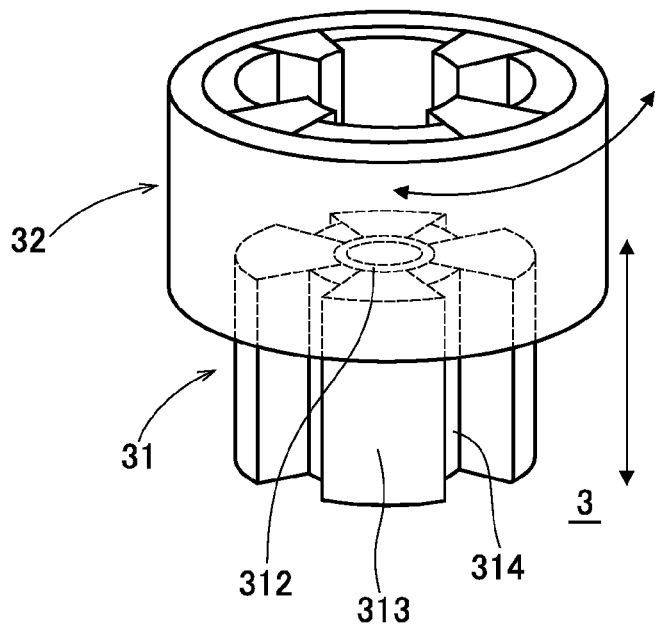
FIG. 10 is a perspective view of a molding die according to a third example.

FIG. 10 illustrates a molding die 3 as another example. The molding die 3 comprises: a divided die 31 prepared by integrating a core, a mainly molding die 312 and intermediate yokes 313 as used in the molding die 1 or the molding die 2 and nonmagnetic materials 314; and a divided die 32 prepared by integrating main permanent magnets, subsidiary permanent magnets and a back yoke as used in the molding die 1 or the molding die 2.

When the magnetized compact is to be demagnetized, the compact in combination with the divided die 31 is initially caused to move downward relatively to the divided die 32. The divided die 32 is then rotated by the angle for one magnetic pole pitch (90 degrees in the present example). The divided die 31 is finally caused to relatively move upward thereby being combined with the divided die 32 as in the original state. This sequence of operation allows the compact having been held by the divided die 31 to be applied thereto with the demagnetizing magnetic fields from the divided die 32, and the compact is thereby demagnetized. The demagnetizing magnetic fields during this operation are also such that the strengths thereof are the same as those of the aligning magnetic fields but the directions are absolutely opposite.

Unlike the molding die 1 or the molding die 2, the molding die 3 is not required that subsidiary permanent magnets and/or intermediate yokes are divided. The number of components can thus be significantly reduced. Moreover, by using the molding die 3, unlike the case of using the molding die 1, the same strengths of the demagnetizing magnetic fields as those of the aligning magnetic fields can be applied to the compact. Even in this case, however, complete neutralization may not necessarily be performed because an actual demagnetization level is determined by permeance coefficient, temperature and magnetic characteristic of the compact and magnitude of the aligning magnetic fields.

Example 4

Figure 11:
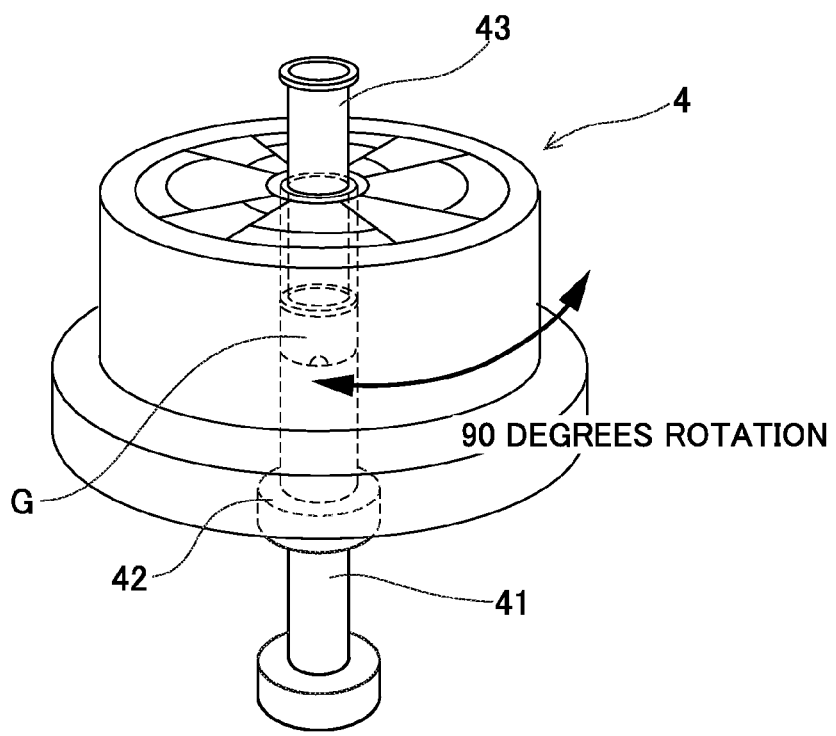
FIG. 11 is a perspective view when a molding die according to a fourth example is rotated.
Figure 12:
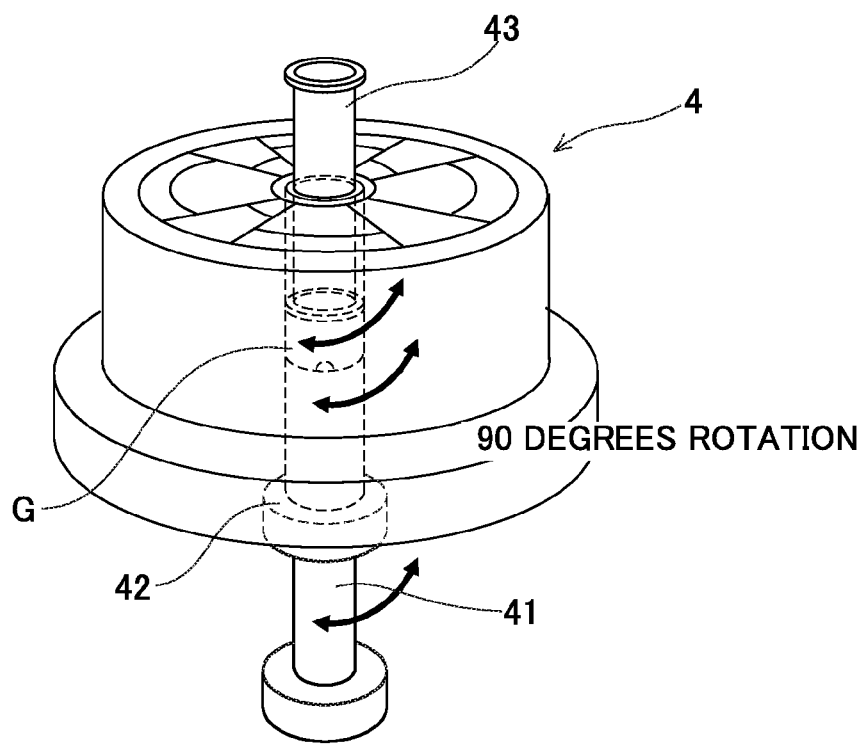
FIG. 12 is a perspective view when a compact according to the fourth example is rotated.

FIG. 11 and FIG. 12 illustrate a molding die 4 as another example. Unlike the above-described molding dies, the molding die 4 is not divided. In the present example, the molding die 4 and compact G are relatively rotated to apply the demagnetizing magnetic fields to the magnetized compact G. FIG. 11 illustrates the case where the molding die 4 itself is rotated relatively to the compact G by the angle for one magnetic pole pitch (90 degrees in the present example). In contrast, FIG. 12 illustrates the case where the compact G itself is rotated relatively to the molding die 4 by the angle for one magnetic pole pitch (90 degrees in the present example). The demagnetizing magnetic fields during this operation are also such that the strengths thereof are the same as those of the aligning magnetic fields but the directions are absolutely opposite, and the magnetized compact can thus be efficiently demagnetized.

Note that the compact G immediately after being molded under high temperature and high pressure may be in close contact with the annular cavity inner wall surface of the molding die 4. Accordingly, in order that the compact G and the molding die 4 can be smoothly rotated relative to each other, the compact G is preferred to be knocked out (KO) a little thereby being released from the close contact. Specifically, the compact G may be caused to move a little upward or downward while being interposed among a core 41, a lower punch 42 and an upper punch 43. In addition, at the time of rotating the compact G as shown in FIG. 12, the compact G may be rotated while being interposed among the core 41, the lower punch 42 and the upper punch 43.

Example 5

Figure 13:
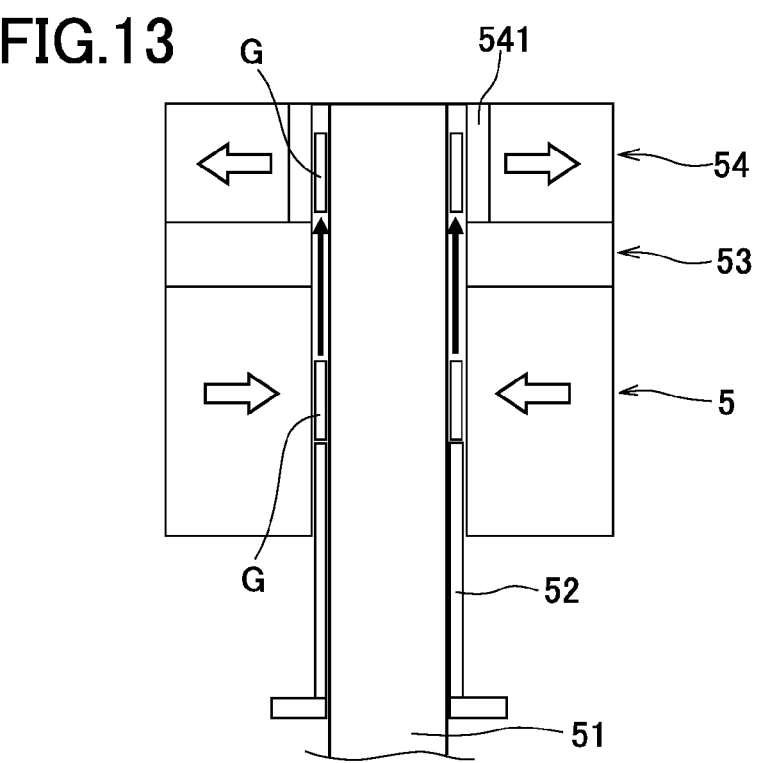
FIG. 13 is a longitudinal sectional view illustrating a discharging step for a compact according to a fifth example.

FIG. 13 illustrates another example. The present example comprises a molding die 5, a magnetic shield 53 placed on the upper surface side of the molding die 5, and a neutralizing apparatus 54 placed on the upper surface side of the magnetic shield 53. The molding die 5 compressively molds the compound in the aligning magnetic fields in the annular cavity, but does not perform the demagnetization of the obtained compact G. The magnetic shield 53 blocks the aligning magnetic fields applied to the annular cavity of the molding die 5 from leaking to the neutralizing apparatus 54. This magnetic shield 53 is comprised of nonmagnetic material, such as nonmagnetic stainless steel, aluminum and ceramics. Note that the core 51 is preferred to be formed with a magnetic shield part at a position corresponding to the magnetic shield 53 as well.

The neutralizing apparatus 54 comprises: a hollow cylindrical body 541 (tubular body) comprised of non magnetic material; and an electromagnet that applies demagnetizing magnetic fields from the outer periphery of the hollow cylindrical body 541 thereto. The compact G having been molded in magnetic fields in the annular cavity of the molding die 5 is knocked out upward by a lower punch 52 using a core 51 as a guide (discharging step) while being engaged into the hollow cylindrical body 541 (tubular body) (engaging step). The hollow cylindrical body 541 and the lower punch 52 represent the engaging means in the present invention. Thereafter, the neutralizing apparatus 54 applies demagnetizing magnetic fields (or neutralizing magnetic fields) to the compact G, which has been engaged into the hollow cylindrical body 541, in directions (opposite directions to the aligning magnetic fields) as shown by un-filled arrows (FIG. 13) (neutralizing step, demagnetizing step). This causes the compact to be neutralized or demagnetized.

Note that, in the case such as where the hollow cylindrical body 541 is a part of a product, a press-fitting step may be performed in which the compact G is directly press-fitted into the hollow cylindrical body 541 after the demagnetizing step as described with reference to Examples 1 to 4 or a neutralizing step has been performed. In this case, the press-fitting step is also operated concurrently as the discharging step. This applies to the following examples. In addition, the neutralizing apparatus 54 may employs permanent magnets as magnetic field sources for the demagnetizing magnetic fields, but using electromagnets as magnetic field sources enables absolutely non-magnetic field. As a result, the compact G can be more easily taken out from the molding die 5 while retaining its shape.

Note further that the present inventors have confirmed that the compact easily retain its shape without collapsing by being press-fitted rather than by merely being engaged if the demagnetizing step or neutralizing step is not performed.

Example 6

Figure 14:
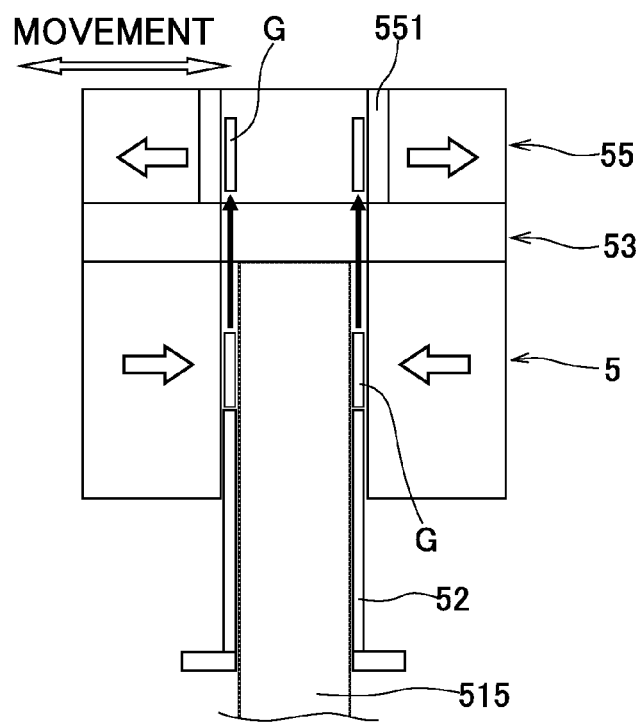
FIG. 14 is another longitudinal sectional view illustrating a discharging step for a compact according to the fifth example.

FIG. 14 illustrates another example. The present example is essentially similar to Example 5 shown in FIG. 13. Note, however, that demagnetizing apparatus 55 is movable in the horizontal direction in the figure, unlike the neutralizing apparatus 54. Accordingly, the compact G stored in hollow cylindrical body 551 can be carried to the subsequent step with the demagnetizing apparatus 55 after being demagnetized (or further neutralized).

Note also that the compact is intrinsically thin-walled and light-weight and the outer peripheral surface of the compact G is at least in a state of contacting with the inner peripheral surface of the hollow cylindrical body 551 (in particular, in a state of close contact therewith if the engaging step is the press-fitting step). Accordingly, the compact G is unlikely to drop out from the hollow cylindrical body 551 even after the demagnetization/neutralization. Moreover, if the demagnetizing magnetic fields are continued to be applied to the compact G from the demagnetizing apparatus 55, then the compact G is also continued to be magnetically adsorbed to the hollow cylindrical body 551, and the compact G is thereby prevented from being dropped out during transportation. Furthermore, if the magnetic field sources of the demagnetizing apparatus 55 are electromagnets, shutting off the supplied current after the transportation allows the compact G to be easily taken out. Thus, the takt time for a ring-like bonded magnet R may further be reduced by continuously and smoothly performing the discharging, demagnetizing/neutralizing and transporting the compact G as a sequence of steps.

Meanwhile, in the present example, the upper end (upper surface in the compressing direction) of the core 515 is flushed with the upper surface of the molding die 5 in order for the demagnetizing apparatus 55 to be movable. This allows to reduce the size of a production apparatus (molding apparatus) while suppressing the aligning magnetic fields to leak to the side of the demagnetizing apparatus 55 even without forming a magnetic shield part in the core 515. However, since the upper portion of the core 515 does not extend into the hollow cylindrical body 551, the core 515 cannot act as a guide for engaging the compact G into the hollow cylindrical body 551. Nonetheless, the compact G is demagnetized or neutralized by the demagnetizing apparatus 55, thus not affecting its shape retaining ability.

It is worth considering here that the demagnetizing apparatus 55 has permanent magnets as magnetic field sources for the demagnetizing magnetic fields. In this case, the compact G held by the hollow cylindrical body 551 may be subjected to a heat treatment (cure thermal process) for thermally curing the binder resin, without any additional treatment. In this regard, permanent magnets having Curie point higher than the cure thermal process temperature may be preferably used for this demagnetizing apparatus 55.

The compact G with its cured binder resin can be taken out from the hollow cylindrical body 551 by the knocking out using a punch or other appropriate means because the compact G no longer self collapses. The compact G taken out is applied thereto with strong pulse magnetic fields or the like thereby to be magnetized (magnetizing step), and the ring-like bonded magnet R is thus obtained. Note that, if the demagnetizing apparatus 55 employs electromagnets as magnetic field sources for the demagnetizing magnetic fields, the compact G is completely neutralized and the risk of self-collapsing no longer exists. In this respect, it is enough that only the compact G may be taken out from the hollow cylindrical body 551 and transported to the subsequent step, and a cure thermal process or other processes are unnecessary to be performed for the compact G with the demagnetizing apparatus 55 or the hollow cylindrical body 551.

Example 7

As a modified example of Example 6, there may be considered a case where the whole of demagnetizing apparatus 55 is configured as a soft magnetic hollow cylindrical body comprised of soft magnetic material (i.e. a case where no magnetic field source is provided). When the compact G is press-fitted or engaged into this soft magnetic hollow cylindrical body, the outer peripheral surface of the compact G is magnetically adsorbed to the inner peripheral surface of the soft magnetic hollow cylindrical body to be in close contact therewith (a state of being in close contact or a state of merely being in contact). In this case, the compact G retains its shape and is protected by the soft magnetic hollow cylindrical body, and the transportation and handling thereof come to be easy. After being subjected to a cure thermal process with the soft magnetic hollow cylindrical body, the compact G is taken out from the soft magnetic hollow cylindrical body and magnetized, and a ring-like bonded magnet R can thereby be obtained. Note that the taking out of the compact G from the soft magnetic hollow cylindrical body is performed by knocking out using a punch or other appropriate means.

Example 8

Figure 15:
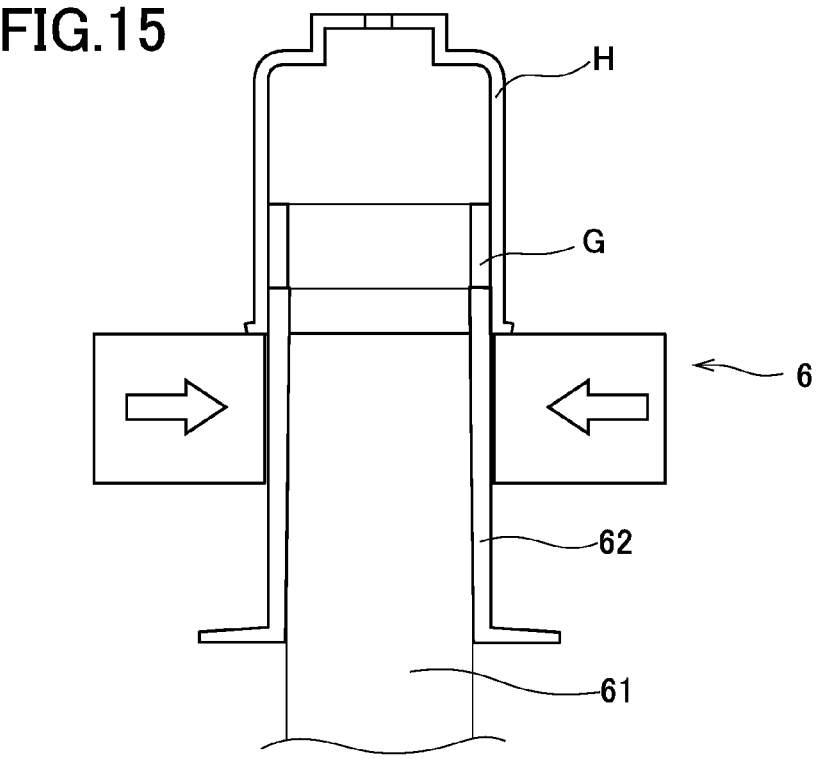
FIG. 15 is a longitudinal sectional view illustrating an engaging step for a compact according to a sixth example.
Figure 16A:
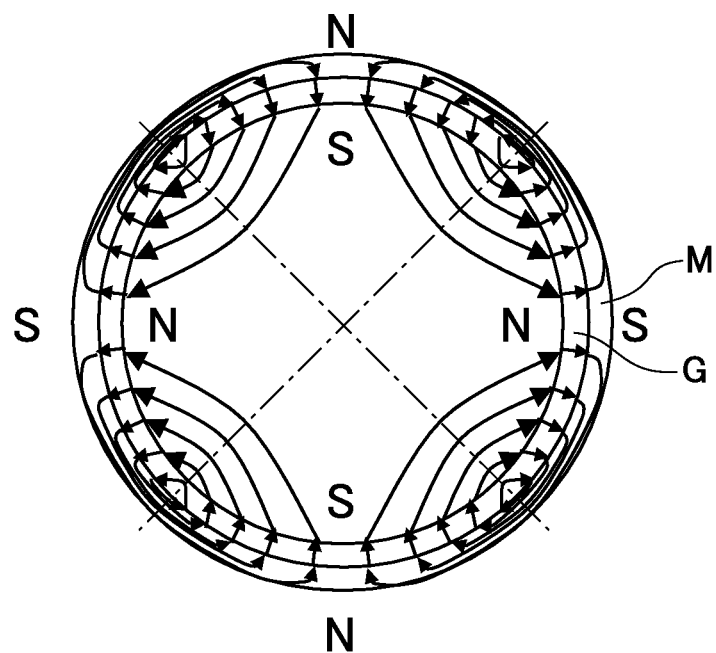
FIG. 16A is a magnetic field line diagram illustrating magnetic closed loops when a compact after an alignment step is engaged into a soft magnetic tubular body.
Figure 16B:
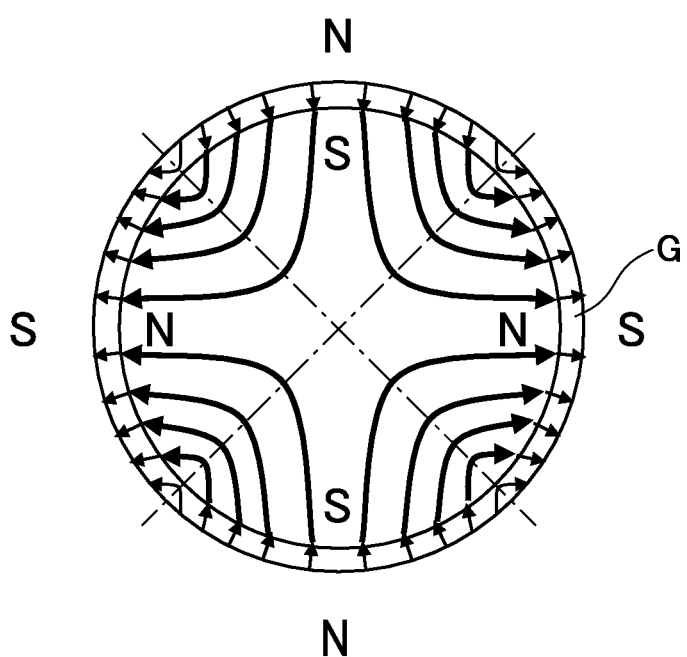
FIG. 16B is a magnetic field line diagram illustrating magnetic open loops of the compact alone after the alignment step.

FIG. 15 illustrates another example. This example is a case where the soft magnetic hollow cylindrical body in Example 7 is configured as a motor housing H. That is a case where the compact G having been molded in magnetic fields in a molding die 6 is directly engaged into the motor housing H comprised of soft magnetic material. The transportation of the compact G into the motor housing H (housing) may be performed by causing a lower punch 62 to move upward. During this transportation, core 61 guides the compact G only partway through. However, as described with reference to Example 7, the compact G is magnetically adsorbed in the motor housing H comprised of soft magnetic material, so that the shape of the compact G is retained by the motor housing H.

In a case such as where the outer peripheral surface of the compact G contacts only partially with the inner peripheral surface of the motor housing H, the compact G may also be fixed in the motor housing H in combination with adhesive or the like. In either case, the compact G having been integrated with the motor housing H is further magnetized after being subjected to a cure thermal process, and a motor housing with magnet can thereby be obtained. In addition, a modified example of the present example is possible where, after the demagnetizing step as described in Examples 1 to 4 or the neutralizing step has been performed in molding die 6, a press-fitting step (which also operates as a discharging step) may be performed such that the compact G is directly press-fitted into the motor housing H. Such a motor housing with magnet has no air gap to thereby efficiently form magnetic loops and prevent the self-collapsing of the compact, and therefore, the coaxiality and the concentricity are improved between the ring-like bonded magnet R and the motor housing H. Moreover, air gaps, such as an air gap between the ring-like bonded magnet R and the motor housing H as a yoke and an air gap between the ring-like bonded magnet R and an armature, will be reduced, and a high-performance motor can thus be obtained.

According to the present example or the modified example thereof, a press-fitting step of the ring-like bonded magnet R into the motor housing H can be omitted to also reduce the takt time for a motor housing with magnet. Note that, if the magnetization of the compact G and other treatments are performed at a remote location, the motor housing H acts also as means for carrying the compact G while retaining its shape.

Example 9

The production method for a permanent magnet for field magnet (anisotropic boded magnet) as described with reference to Example 1 may be altered as below.

(1) In Example 1, the filling step is performed in a state where the molding die 1 is preliminarily located in the aligning arrangement (location shown in FIG. 2 or FIG. 4). In this case, the annular cavity c is applied thereto with the aligning magnetic fields by the main permanent magnets 14 and other components. Accordingly, the compound put into the annular cavity c may possibly adhere to the opening or the inner peripheral surface of the annular cavity c thereby disturbing smooth filling.

Figure 17:
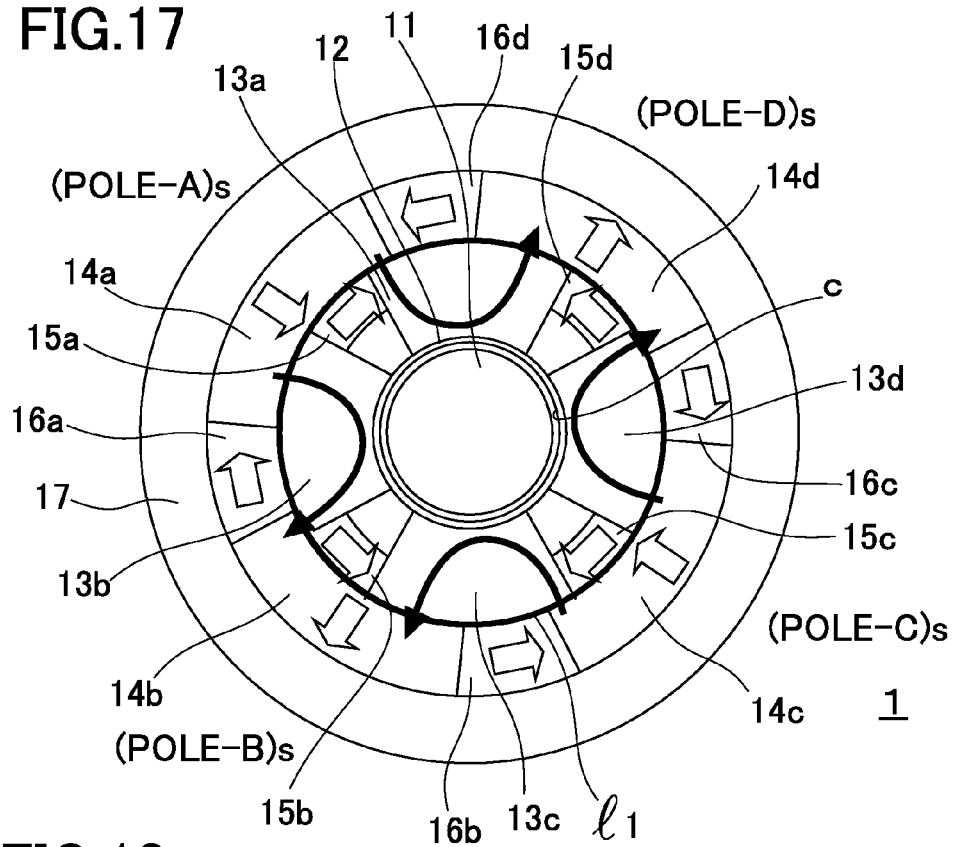
FIG. 17 is a cross-sectional view when movable parts of a molding die are in a non-magnetic field arrangement.

In this regard, the filling step is preferably performed in a condition where no magnetic field acts on the annular cavity c (referred to as "non-magnetic field condition"). Such a non-magnetic field condition can be easily achieved by rotating the movable parts of the molding die 1 by a specific angle ($\theta_S$) from the aligning arrangement condition, as shown in FIG. 17.

Figure 18:
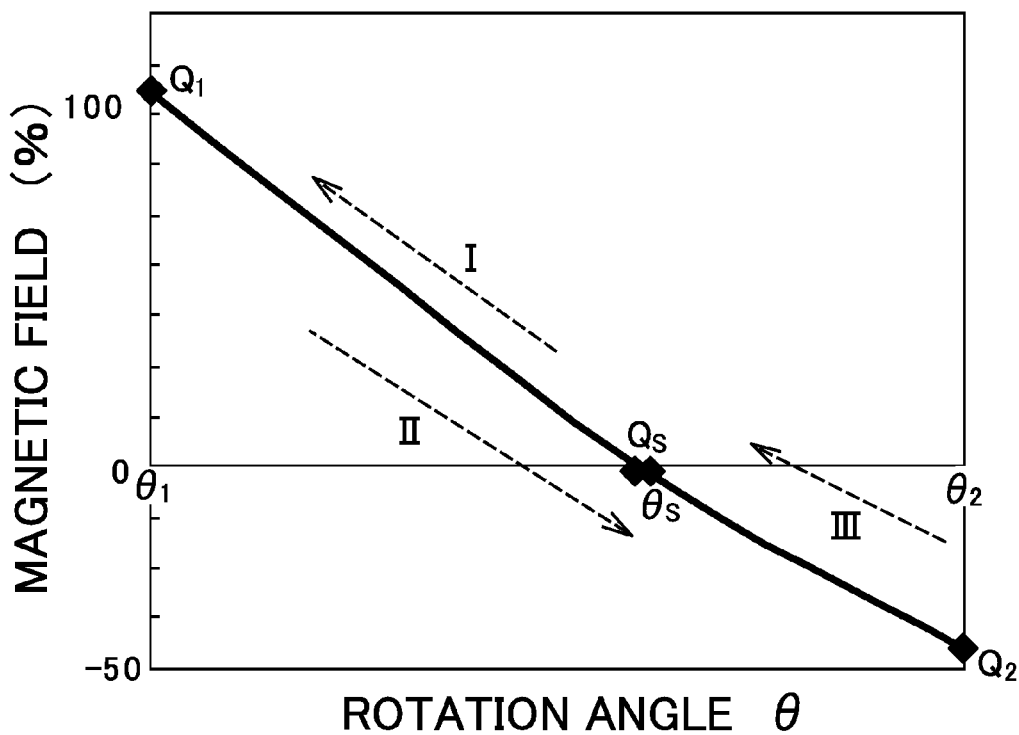
FIG. 18 is an explanatory diagram illustrating the relationship between a rotation angle of movable parts of the molding die and a magnetic field acting on an annular cavity.

At least one such a specific angle ($\theta_S$) certainly exists within a section [$\theta_1$, $\theta_2$], where $\theta_1 < \theta_S < \theta_2$ (refer to FIG. 18). It is assumed herein that $\theta_1$ (e.g. zero degree) represents the rotation angle of the movable parts of the molding die 1 in the aligning arrangement (refer to FIG. 4), and $\theta_2$ (e.g. 90 degrees) represents the rotation angle when the movable parts are in the demagnetizing arrangement (refer to FIG. 5) after being rotated to the left (positive rotation) by a magnetic pole unit angle.

The reason is as follows. Each magnetic field acting on the annular cavity c continuously changes from the aligning arrangement ($\theta_1$) to the demagnetizing arrangement ($\theta_2$) in response to the rotation of the movable parts of the molding die 1. In addition, as previously described, the aligning magnetic field in aligning arrangement ($\theta_1$) and the demagnetizing magnetic field in the demagnetizing arrangement ($\theta_2$) are inverted to each other in terms of the direction of magnetic field. In other words, the magnetic field continuously changes from positive quantity to negative quantity within the section [$\theta_1$, $\theta_2$].

If so, according to the so-called intermediate value theorem, the magnetic field acting on the annular cavity c is to certainly have at least one border that changes in direction thereof (i.e. zero-point where positive and negative of magnetic field are reversed) within the section [$\theta_1$, $\theta_2$]. In addition, the magnetic field acting on the annular cavity c monotonically changes in practical use from the aligning arrangement ($\theta_1$) to the demagnetizing arrangement ($\theta_2$). Hence, one rotation angle ($\theta_S$) where the magnetic field is zero exists within the section [$\theta_1$, $\theta_2$]. Hereinafter, the arrangement of the molding die 1 in this condition is referred to as "non-magnetic field arrangement".

Magnetic fields within the molding die 1 in this non-magnetic field arrangement are shown by filled and curved arrows in FIG. 17. As apparently understood from the above, the reason why no magnetic field acts on the annular cavity c when the molding die 1 is in the non-magnetic field arrangement is that magnetic circuits are completely short-circuited between neighboring main permanent magnets 14 via the intermediate yokes 13 located therebetween.

Even without considering the reason why the molding die 1 can achieve the non-magnetic field arrangement, if the molding die 1 is caused to be in such a non-magnetic field arrangement before the filling step, magnetic fields are unlikely to affect the filling step, so that the compound or the preliminary compact therefrom (blank material) may be more smoothly filled in the annular cavity c.

Therefore, it is preferred that the present invention comprises a filling preparation step that disposes, before the filling step, the aligning magnetic pole bodies at non-magnetic field positions which exert no magnetic field to the annular cavity. Note that the "non-magnetic field positions" as used herein necessarily include not only unique positions (rotation angles) where no magnetic field acts on the annular cavity at all but also positions in the vicinity thereof. It is enough if being positions where the above purpose is reflected in consideration of industrial manufacturing. In the above example, it is enough if the rotation angle of the movable parts of the molding die 1 is approximately $\theta_S$.

(2) Similar matters to the above-described filling step can be said about the discharging step according to Example 1. That is, if the molding die 1 is in the non-magnetic field arrangement before the discharging step, then the compact is unlikely to collapse due to unnecessary magnetic forces etc. caused to act during the discharging step. Moreover, during the discharging step, the discharging ability is prevented from being disturbed due to that the compact is magnetically adsorbed to the core 11 and/or the mainly molding die 12 which constitute the annular cavity. Furthermore, during discharging the compact from the annular cavity c or during the press-fitting the discharged compact into the hollow cylindrical body, the compact is unlikely to be partially lost.

Therefore, it is preferred that the present invention comprises a discharging preparation step that disposes, before the discharging step (and after the demagnetizing step), the aligning magnetic pole bodies at non-magnetic field positions which exert no magnetic field to the annular cavity. This allows the compact to be more smoothly discharged from the annular cavity during the discharging step.

(3) Either one of the filling preparation step and the discharging preparation step may be provided, but employing both is of course preferable. For the latter case, one example is shown in FIG. 18, in which the relationship between the rotation angle of the movable parts of the molding die 1 and the magnetic field acting on the annular cavity c is illustrated. Note that the assumption is that the magnetic field is of 100 percent and the rotation angle is $\theta_1$ (=0 degree) when the molding die 1 is in the aligning arrangement, while the magnetic field is of −50 percent and the rotation angle is $\theta_2$ (=90 degrees) when the molding die 1 is in the demagnetizing arrangement. The correspondence relationship between the rotation angle of the movable parts of the molding die 1 and each step is as follows.

First in the filling preparation step, the movable parts of the molding die 1 are set in the non-magnetic field arrangement $Q_S$ ($\theta=\theta_S$) where the magnetic field acting on the annular cavity c is substantially zero. In this condition, the filling step is performed.

The rotation angle of the movable parts of the molding die 1 then changes from $\theta_S$ to $\theta_1$ so that the molding die 1 transitions from the non-magnetic field arrangement Qs to the aligning arrangement $Q_1$. From the initiation of that transition and for a while after that transition, the alignment step and the molding step are performed.

Subsequently, the rotation angle of the movable parts of the molding die 1 changes from $\theta_1$ to $\theta_2$ so that the molding die 1 transitions from the aligning arrangement $Q_1$ to the demagnetizing arrangement $Q_2$. From around passing through the non-magnetic field arrangement $Q_S$, the molding die 1 starts being subjected to the demagnetization of the compact, and the demagnetizing step is substantially completed when the molding die 1 is in the demagnetizing arrangement $Q_2$.

Thereafter, the rotation angle of the movable parts of the molding die 1 changes from $\theta_2$ to $\theta_S$ again so that the molding die 1 transitions from the demagnetizing arrangement $Q_2$ to the non-magnetic field arrangement $Q_S$. From immediately after this discharging preparation step is completed, the discharging step is performed.

Thus, when one compact is produced, the rotation angle of the movable parts of the molding die 1 changes through three stages: $\theta_S$ to $\theta_1$ (change I); $\theta_1$ to $\theta_2$ (change II); and $\theta_2$ to $\theta_S$ (change III). Further, each step assigned to each stage is repeated to thereby rapidly and efficiently produce compacts and therefore permanent magnets for field magnets.

Note that, although a case is mentioned where the movable parts of the molding die 1 move in reciprocal motion (positive rotation and reverse rotation) within the section [$\theta_1$, $\theta_2$], step-by-step rotation with a certain angle may also be performed in each direction (either positive or negative rotation).

Example 10

(1) In the Examples 1 to 9, the description has been made for cases where the compact is produced by using the upper punch and the lower punch to compressively mold the compound filled in the annular cavity c which is formed by the core 11 and the mainly molding die 12. However, contents described with reference to the above examples may represent not only cases where the compact is produced by compression molding but also cases where the compact is produced by injection molding.

For example, magnet raw material in softened state or molten state is filled by injection into an annular cavity that is formed by a movable die and a fixed die (mainly molding dies) for injection molding (filling step). This magnet raw material is applied thereto with the aligning magnetic fields like the above-mentioned examples (alignment step). The mainly molding dies are cooled in this state, and the compact is thereby obtained in which the binder resin is cooled to be solidified (molding step). Thereafter, the movable die is evacuated upward or laterally before a discharging mechanism provided on the fixed die is operated to discharge the compact (discharging step). During this discharging, the compact already has a commensurate strength thereby being unlikely to self-collapse because the binder has been cooled to be solidified.

Therefore, even if the demagnetizing step is not necessarily performed, the compact is easily press-fitted into the tubular body in parallel with the discharging step (press-fitting step). However, in the case where the thickness of the compact is made extremely thin for a rare-earth anisotropic bonded magnet, the strong magnetic force may possibly cause the compact to be self-collapsed or deformed. In such a case, it is effective to appropriately perform the demagnetizing step or the neutralizing step after the molding step.

Note that thermoplastic resin is preferably used as the binder resin when the injection molding is performed. This is because such thermoplastic resin can be cooled to be solidified for a given short time. In this case, cure thermal process and associated processes are also unnecessary, which would be required for thermosetting resins such as described in the above.

(2) Moreover, not only in the case of the compression molding but even in the case of the injection molding, whether the above-described demagnetizing step or neutralizing step is performed or not, it is preferred that the filling preparation step is performed with or without the discharging preparation step in the previously-described manner. Performing the filling preparation step provides advantages such as allowing to reduce the driving force for filling the annular cavity with the magnet raw material thereby making the filling step easily be completed. Furthermore, performing the discharging preparation step provides advantages such as allowing to reduce the driving force for discharging the compact from the annular cavity thereby making the discharging step easily be completed. Note that either one of the filling preparation step and the discharging preparation step may be performed, but more preferred is that both are performed. In addition, if the filling preparation step and the discharging preparation step are performed, it is furthermore preferred that the molding die is rotated such that the alignment step and further the demagnetizing step are performed on the way from the filling preparation step to the discharging preparation step.

(3) In the case where the compact is obtained by injection molding, it is preferred that the production apparatus for an anisotropic bonded magnet comprises: a mainly molding die that comprises a movable die and a fixed die to form an annular cavity; and an aligning magnetic pole body that includes an even number of permanent magnets arranged uniformly around and in the vicinity of outer periphery of the mainly molding die such that directions of magnetic fields thereof are alternately reversed, wherein the permanent magnets are capable of providing an aligning magnetic field to the annular cavity, and wherein the production apparatus is characterized by further comprising a driving means that causes the aligning magnetic pole body to relatively move with respect to the annular cavity only in circumferential direction.

In the case where the demagnetizing step is not performed, it is preferred that the production apparatus according to the present invention is a production apparatus for an anisotropic bonded magnet, comprising: a mainly molding die that comprises a movable die and a fixed die to form an annular cavity; and an aligning magnetic pole body that includes an even number of permanent magnets arranged uniformly around and in the vicinity of outer periphery of the mainly molding die such that directions of magnetic fields thereof are alternately reversed, the permanent magnets being capable of providing an aligning magnetic field to the annular cavity, the production apparatus being characterized by further comprising an engaging means that engages a compact into a tubular body while discharging the compact from the annular cavity, the compact being capable of being molded in the annular cavity, the tubular body being provided coaxially with the annular cavity and having an inner peripheral surface capable of being contacted with outer peripheral surface of the compact. Note that, in the case where injection molding is performed, the engaging means is preferably a press-fitting means that press-fits the compact into the tubular body because the compact is already cooled to be solidified. Typically, a part of the previously-described fixed die acts as the press-fitting means, and a discharging mechanism provided on the fixed die operates to perform the press-fitting step concurrently as the discharging step.

As described heretofore, the present invention is applicable to the case where an annular anisotropic bonded magnet is produced by compression molding as well as the case of production using injection molding, and the mainly molding die used in the injection molding may be vertical-type one or horizontal-type one.

The invention claimed is:

1. A production apparatus for an annular anisotropic bonded magnet, comprising:
   a molding die that comprises an annular cavity;
   an inner part that includes intermediate yokes arranged uniformly around the outer periphery of the molding die, the inner part is tubular shaped; and
   an outer part that includes main permanent magnets arranged uniformly around the outer periphery of the inner part, the outer part is tubular shaped,
   wherein directions of magnetic fields of the main permanent magnets are alternately reversed, the main permanent magnets as a magnetic field source capable of providing an aligning magnetic field to the annular cavity,
   wherein the outer part comprises a pair of auxiliary permanent magnets arranged adjacent to both sides, in a circumferential direction, of each of the main permanent magnets, same poles of the auxiliary permanent magnets face each other,
   wherein the outer part is rotatable about the inner part in a circumferential direction by a predetermined angle without a movement in a rotation center axis direction.

2. The production apparatus for an annular anisotropic bonded magnet as set forth in claim 1, wherein the outer part comprises outer subsidiary permanent magnets each having N-pole side and S-pole side and being arranged in the circumferential direction, wherein adjacent two of the outer subsidiary permanent magnets are arranged in a opposite direction and face at one of the N-pole sides and the S-pole sides.

3. The production apparatus for an annular anisotropic bonded magnet as set forth in claim 1, wherein the inner part comprises inner subsidiary permanent magnets each having N-pole side and S-pole side and being arranged in the circumferential direction, wherein adjacent two of the inner subsidiary permanent magnets are arranged in a opposite direction and face at one of the N-pole sides and the S-pole sides.

4. The production apparatus for an annular anisotropic bonded magnet as set forth in claim 1, wherein an outer peripheral length of the intermediate yokes is longer than inner peripheral gaps between neighboring ones of the main permanent magnets.

5. The production apparatus for an annular anisotropic bonded magnet as set forth in claim 1, wherein the molding die is a hollow cylindrical body that surrounds a hollow cylindrical or solid cylindrical core.

6. The production apparatus for an annular anisotropic bonded magnet as set forth in claim 5, wherein the hollow cylindrical body comprises non-magnetic material and contacts with an inner peripheral surface of the intermediate yokes.

7. The production apparatus for an annular anisotropic bonded magnet as set forth in claim 1, wherein the molding die comprises a movable die and a fixed die for injection molding.

8. The production apparatus for an annular anisotropic bonded magnet as set forth in claim 1, wherein the annular cavity comprises a mold, a core, an upper punch and a lower punch.

9. The production apparatus for an annular anisotropic bonded magnet as set forth in claim 1, wherein the inner part includes an even number of the intermediate yokes.

10. The production apparatus for an annular anisotropic bonded magnet as set forth in claim 1, wherein the outer part includes an even number of the main permanent magnets.

11. A production method using the production apparatus for an anisotropic bonded magnet according to claim 1, comprising:
   a filling step of filling the annular cavity with a magnet raw material including one or more types of rare-earth anisotropic magnet powder and a binder resin;
   an alignment step of applying aligning magnetic fields to the magnet raw material in the annular cavity to cause the rare-earth anisotropic magnet powder to be aligned in the binder resin being in softened state or in molten state, the aligning magnetic fields being applied from an even number of aligning magnetic pole bodies arranged uniformly around outer periphery of the annular cavity such that directions of magnetic fields thereof are alternately reversed, each of the aligning magnetic pole bodies having a permanent magnet as a magnetic field source;
   a molding step of subjecting the magnet raw material during the alignment step or after the alignment step to a molding to obtain an annular compact; and
   a discharging step of discharging the compact from the annular cavity;
   the production method further comprising:
   a demagnetizing step of causing the aligning magnetic pole bodies to relatively move with respect to the compact only in circumferential direction after the molding step and before the discharging step to apply demagnetization magnetic fields to the compact, the demagnetization magnetic fields being applied from the aligning magnetic pole bodies with opposite poles to those during the alignment step, the demagnetization magnetic fields being in directions for cancelling magnetization of the compact caused by the aligning magnetic fields.

12. The production method for an anisotropic bonded magnet as set forth in claim 11, wherein the demagnetizing step is a step of causing the aligning magnetic pole bodies to relatively rotate with respect to the compact from during the alignment step by an odd multiple of a magnetic pole unit angle that is a minimum angle required for inverting magnetic poles of the aligning magnetic pole bodies arranged around the compact.

13. The production method for an anisotropic bonded magnet as set forth in claim 11, wherein the discharging step is a press-fitting step of press-fitting the compact into a tubular body while discharging the compact from the annular cavity, the tubular body being provided coaxially with the annular cavity and including an inner peripheral surface capable of being contacted with outer peripheral surface of the compact.

14. The production method for an anisotropic bonded magnet as set forth in claim 11, wherein the molding step is a compression molding step or an injection molding step.

15. The production method for an anisotropic bonded magnet as set forth in claim 11, further comprising a filling preparation step of disposing, before the filling step, the aligning magnetic pole bodies at non-magnetic field positions which exert no magnetic field to the annular cavity.

16. The production method for an anisotropic bonded magnet as set forth in claim 11, further comprising a discharging preparation step of disposing, before the discharging step, the aligning magnetic pole bodies at non-magnetic field positions which exert no magnetic field to the annular cavity.

17. The production method for an anisotropic bonded magnet as set forth in claim 11, wherein the tubular body is a magnetic tubular body comprised of a magnetic material.

18. The production method for an anisotropic bonded magnet as set forth in claim 17, wherein the magnetic tubular body is a yoke of an electric motor.

* * * * *